US012791658B2

(12) United States Patent
Subburaj et al.

(10) Patent No.: US 12,791,658 B2
(45) Date of Patent: Nov. 10, 2026

(54) FMCW RADAR SYSTEM WITH CHIRP JITTER REDUCTION

(71) Applicant: Texas Instruments Incorporated, Dallas, TX (US)

(72) Inventors: Karthik Subburaj, Bangalore (IN); Piyush Soni, Bangalore (IN); Vashishth Dudhia, Ahmedabad (IN); Ryan Smith, Lucas, TX (US); Kavithaa Rajagopalan, Bangalore (IN); Karthik Ramasubramanian, Bangalore (IN); Shankar Ram Narayana Moorthy, Bangalore (IN); Indu Prathapan, Bangalore (IN); Samala Sreekiran, Westford, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 349 days.

(21) Appl. No.: 18/499,181

(22) Filed: Oct. 31, 2023

(65) Prior Publication Data

US 2025/0138148 A1 May 1, 2025

(30) Foreign Application Priority Data

Apr. 4, 2023 (IN) ............................ 202341025442

(51) Int. Cl.

*G01S 7/35* (2006.01)
*G01S 7/03* (2006.01)
*G01S 13/32* (2006.01)

(52) U.S. Cl.

CPC ................ *G01S 7/35* (2013.01); *G01S 7/032* (2013.01); *G01S 13/32* (2013.01)

(58) Field of Classification Search

CPC ............................ G01S 7/35; G01S 13/32–40
See application file for complete search history.

(56) References Cited

U.S. PATENT DOCUMENTS 10,955,527 B2 * 3/2021 Murakami ............... H04B 1/16

FOREIGN PATENT DOCUMENTS

WO WO-0163742 A1 * 8/2001 ............ H03B 23/00

* cited by examiner

*Primary Examiner* — Matthew M Barker
(74) *Attorney, Agent, or Firm* — Michael T. Gabrik; Charles F. Koch

(57) ABSTRACT

In described examples, a frequency modulated continuous wave (FMCW) radar includes a reference clock, a phase locked loop (PLL), a pulse generator, a counter, a chirp ramp control circuit, and a synchronization state machine. The reference clock generates a reference clock signal. The PLL generates a feedback clock signal in response to the reference clock signal, and an output signal in response to the feedback clock signal. The pulse generator outputs a chirp start pulse in response to the reference clock signal. The counter increments a count in response to the feedback clock signal. The synchronization state machine provides a chirp ramp signal to a chirp ramp control circuit in response to the reference clock signal, the feedback clock signal, the chirp start pulse, and the count. The chirp ramp control circuit causes the PLL to ramp a frequency of the output signal in response to the chirp ramp signal.

20 Claims, 13 Drawing Sheets

FMCW RADAR SYSTEM WITH CHIRP JITTER REDUCTION

CROSS-REFERENCE TO RELATED APPLICATION

This application claims the benefit of and priority to India Provisional Application No. 202341025442, filed Apr. 4, 2023, each of which is incorporated herein by reference.

TECHNICAL FIELD

This application relates generally to frequency modulated continuous wave (FMCW) radar, and more particularly to determining inter-chirp timing within a frame of FMCW chirps.

BACKGROUND

An FMCW radar transmits an electromagnetic radiation (EMR) signal with a known frequency that is modulated to vary up and down over time. The radar receives a reflected signal corresponding to the transmitted signal, and uses the received signal to determine presence, distance, angle of arrival, speed, and direction of movement of objects within a detection distance limit of the FMCW radar. Speed and direction of movement together correspond to a velocity of a detected object.

SUMMARY

In described examples, a frequency modulated continuous wave (FMCW) radar includes a reference clock, a phase locked loop (PLL), a pulse generator, a counter, a chirp ramp control circuit, and a synchronization state machine. The reference clock generates a reference clock signal. The PLL generates a feedback clock signal in response to the reference clock signal, and an output signal in response to the feedback clock signal. The pulse generator outputs a chirp start pulse in response to the reference clock signal. The counter increments a count in response to the feedback clock signal. The synchronization state machine provides a chirp ramp signal to a chirp ramp control circuit in response to the reference clock signal, the feedback clock signal, the chirp start pulse, and the count. The chirp ramp control circuit causes the PLL to ramp a frequency of the output signal in response to the chirp ramp signal.

DETAILED DESCRIPTION

In some examples, a first clock signal is used to generate a timing signal used for FMCW chirp sampling, and a PLL-generated second clock signal is used for FMCW chirp generation. A frequency divider is used to ramp a frequency of an output signal of the PLL to generate FMCW chirps. The timing signal derived from the first clock is used to generate a trigger signal that causes the frequency divider to begin ramping the PLL output frequency. Interaction between the first clock signal and the PLL could prevent the PLL from locking or pull the PLL out of lock, either of which could prevent accurate FMCW chirp generation. In some examples, the timing signal can prevent or destabilize PLL locking because the timing signal is derived from the first clock. The synchronizer is used to buffer interaction between the timing signal and the PLL to prevent or mitigate these effects on PLL locking. Herein, a PLL locking refers to the PLL locking in frequency and in phase.

The synchronizer circuit path can cause signal race conditions that can lead to random variation of inter-chirp timing of FMCW chirps. Accordingly, the synchronizer can cause the starts of different FMCW chirps to be delayed by different amounts of time. Variations in inter-chirp timing can reduce a Doppler spectral range of the FMCW radar system. In some examples, reduction of Doppler spectral range reduces a range (maximum or minimum) and/or accuracy of velocity measurements for an object within a range and a field of view (FOV) of the FMCW radar system. In some examples, a reduction in Doppler spectral range increases difficulty in detecting a weakly reflecting object, such as a non-metallic object or an object approaching a maximum range of the FMCW radar system.

As further described below, variation in inter-chirp timing can be prevented or mitigated as follows. At the beginning of each data frame of multiple FMCW chirps, the PLL is locked and PLL lock is maintained throughout generation of the data frame. (Data frames are further described below with respect to FIGS. 1A and 1B.) A memory is used to track a reference delay from a chirp start signal to the beginning of a first FMCW chirp of the data frame. A delay from chirp start signals to beginnings of corresponding FMCW chirps is set equal to the stored reference delay. Accordingly, start timing for the first FMCW chirp of a data frame is used to set a delay amount for start timing of later FMCW chirps in the same data frame.

Figure 6:
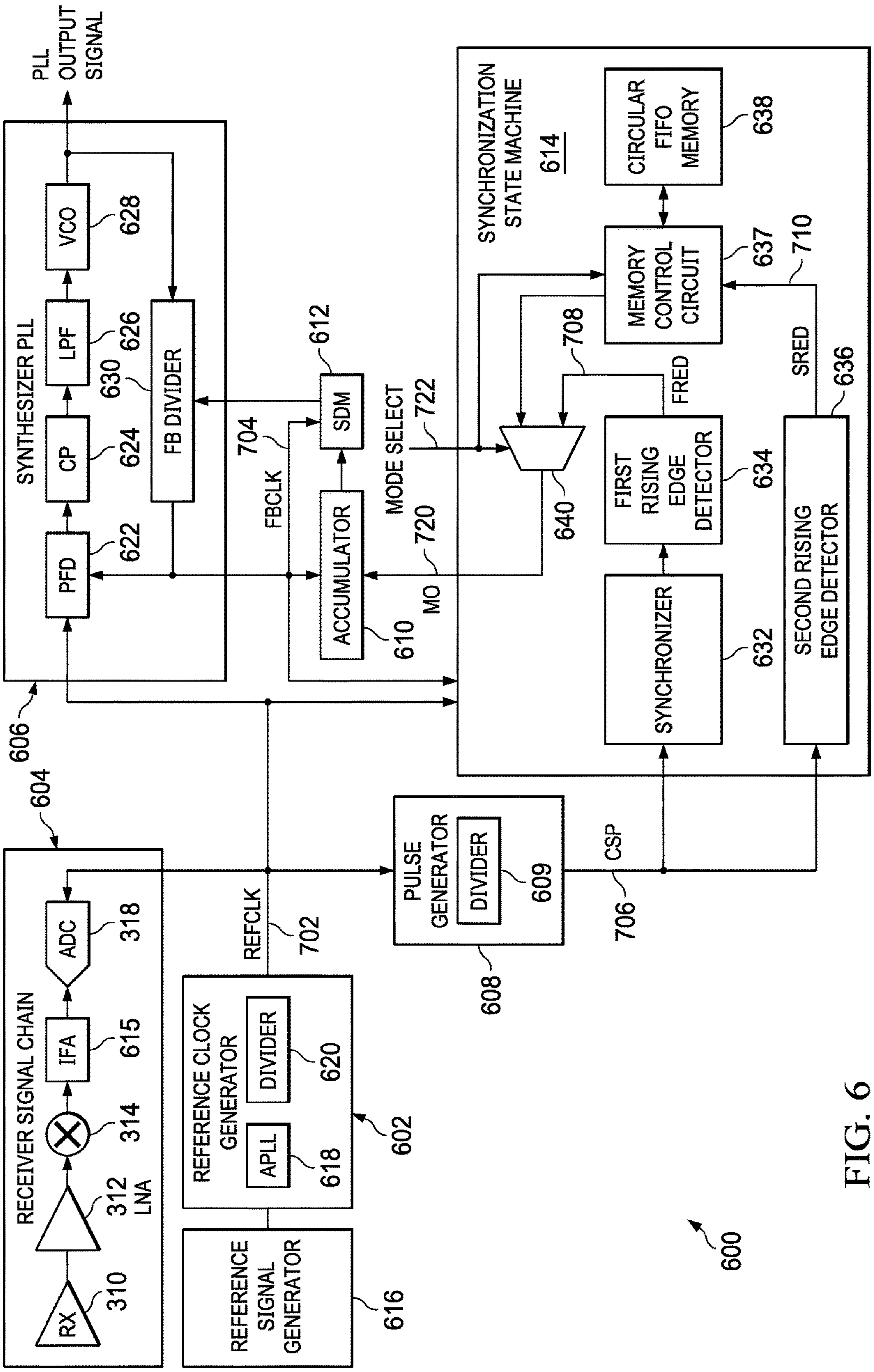
FIG. 6 is a functional block diagram of another example FMCW radar system.

An example FMCW radar system used to mitigate or avoid adverse effects of clock synchronization-induced delay is described with respect to FIG. 6. Signal timing of the FMCW radar system of FIG. 6 is described with respect to FIG. 7. A process for mitigating or avoiding adverse effects of clock synchronization-induced delay is described with respect to FIG. 8.

Herein, some structures or signals that are distinct but closely related have reference numbers that use a [number] [letter] format, such as transmitters 206*a*, 206*b*, and 206*c*, and receivers 310*a*, 310*b*, 310*c*, and 310*d*. In some examples, these structures or signals are referred to generally, in the singular or as a group, using the [number] and without the [letter], such as the transmitters 206 and the receivers 310. Also, the same reference numbers or other reference designators are used in the drawings to designate features that are closely related structurally and/or functionally.

Herein, reference to transmitters and receivers herein refers to corresponding transmitting or receiving antennas. In some examples, antennas are located separately (such as on a different portion of a printed circuit board (PCB) from, and are electrically connected to, integrated circuits (ICs) that contain other portions of respective transmitter-related and receiver-related structure.

Figure 1A:
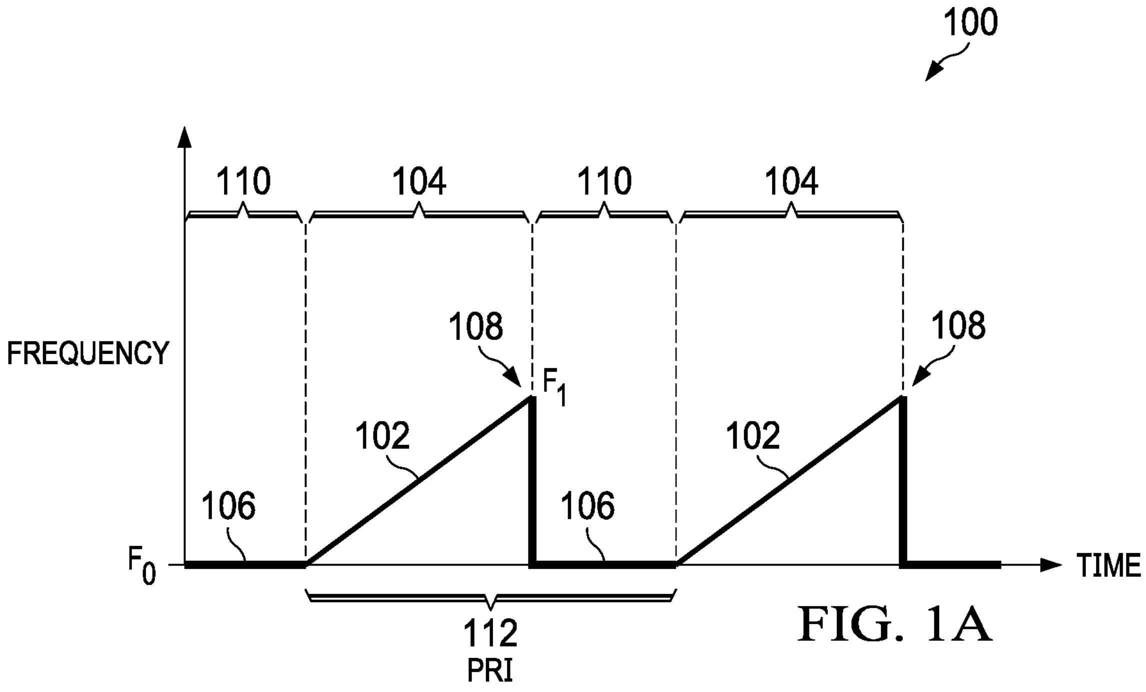
FIG. 1A is a graph of an example FMCW signal to be transmitted by an FMCW radar system.

FIG. 1A is a graph of an example FMCW signal 100 to be transmitted by an FMCW radar system, such as an automotive or industrial FMCW radar system. The vertical axis corresponds to frequency, and the horizontal axis corresponds to time. The FMCW signal 100 is modulated to define FMCW chirps 102. The duration of an FMCW chirp 102 is referred to herein as the ramp time 104. During an FMCW chirp 102, the transmitter frequency may ramp upwards like a sawtooth wave, from a base frequency $F_0$ 106 to a maximum frequency $F_1$ 108. An FMCW chirp 102 has a slope $S=(F_1-F_0)$/ramp time. The slope of the FMCW signal 100 corresponds to a change in frequency per unit of time, for example, ΔHz/s. Between FMCW chirps 102 are idle times 110. An idle time 110 is a period during which a transmitter transmitting the FMCW signal 100 is turned off.

The time from the beginning of one FMCW chirp 102 to the beginning of the next FMCW chirp 102 of the same transmitter is referred to as the pulse repetition interval (PRI) 112 of the FMCW signal 100, and equals the ramp time 104 plus the idle time 110 of the transmitter. Equivalently, the PRI 112 equals the number of transmitters in an FMCW radar system, multiplied by the total of the ramp time 104 for one FMCW chirp 202 plus the time from the end of the FMCW chirp 202 to the beginning of the sequentially next FMCW chirp 202 by another transmitter of the FMCW radar system (the ramp time 104 plus an inter-chirp time). In some examples, the duration of a PRI 112 defines a maximum discernable Doppler range. The inverse of the PRI 112 is the pulse repetition frequency (PRF) of the FMCW signal 100.

Fast time refers to the different time slots composing a PRI 112 during a single FMCW chirp 102, and is dependent on the rate at which a received signal is sampled. Slow time updates after each PRI 112, and refers to time over the course of multiple FMCW chirps 102.

Figure 1B:
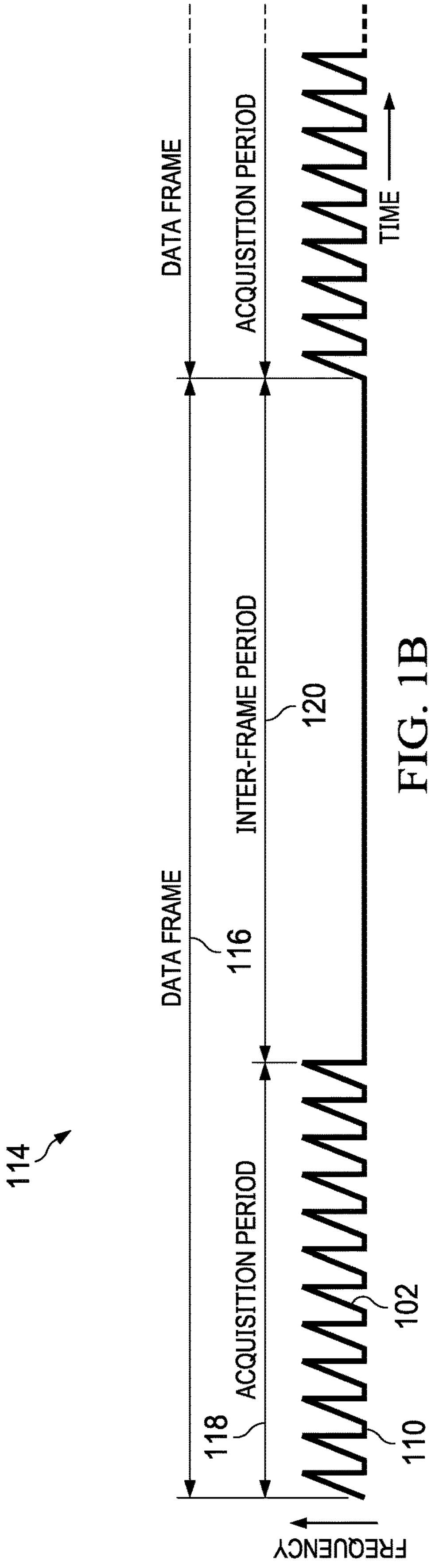
FIG. 1B is a graph of an example data frame of FMCW signals to be transmitted by an FMCW radar system.

FIG. 1B is a graph 114 of an example data frame 116 of FMCW signals 100 to be transmitted by an FMCW radar system. A data frame 116 includes an acquisition period 118 and an inter-frame period 120. The acquisition period includes a series of FMCW chirps 102 from the various transmitters 206 (see FIG. 2A). During the inter-frame period 120 the transmitters 206 transmit no signal. In some examples, the inter-frame period 120 is used to conserve power, or to provide time to complete analysis of received reflected signals corresponding to the FMCW chirps 102 transmitted during the acquisition period 118.

Figure 2A:
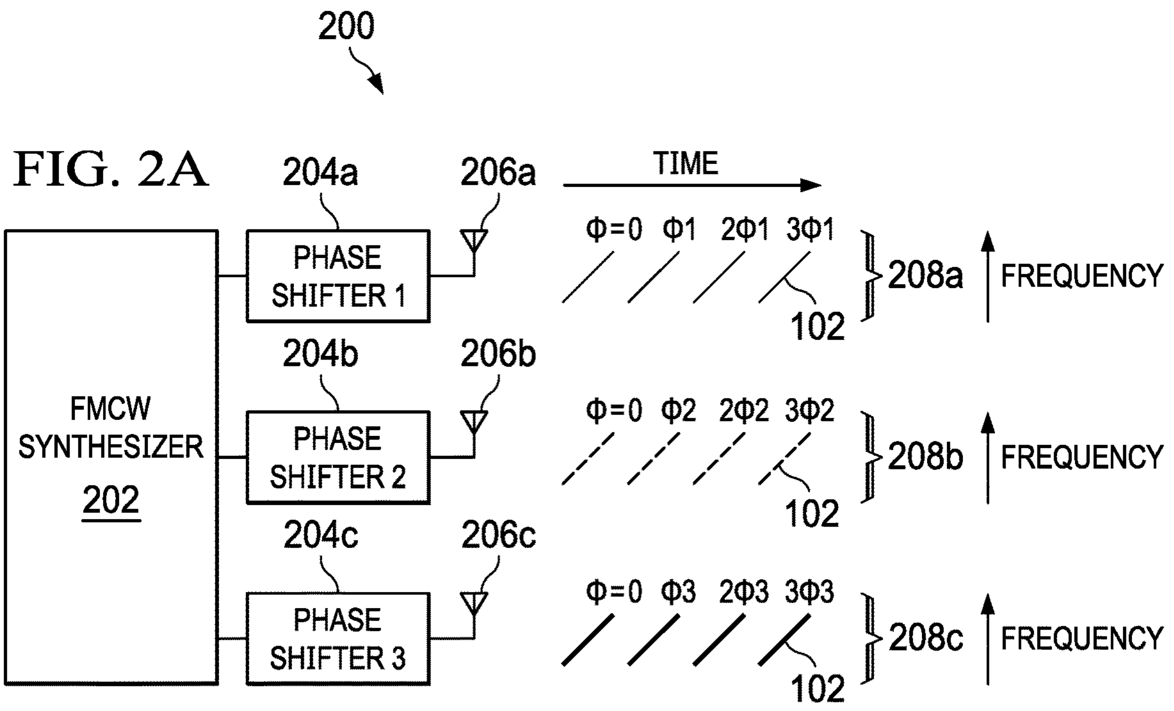
FIG. 2A is a diagram of an example Doppler division multiple access (DDMA) FMCW transmission.

FIG. 2A is a diagram of an example Doppler division multiple access (DDMA) FMCW transmission 200. DDMA is used herein as an example transceiver protocol; other transceiver protocols, such as Time Division Multiple Access (TDMA) or Binary Phase Modulation, can also be used with methods and systems described herein. An FMCW synthesizer 202 (see FIG. 3, also referred to as an FMCW signal generator) generates an FMCW signal 100. The FMCW synthesizer 202 outputs the FMCW signal 100 to a first phase shifter (phase shifter 1) 204*a*, a second phase shifter (phase shifter 2) 204*b*, and a third phase shifter (phase shifter 3) 204*c*. The first phase shifter 204*a* outputs a phase shifted FMCW signal 100 to a first transmitter 206*a*. The second phase shifter 204*b* outputs a phase shifted FMCW signal 100 to a second transmitter 206*b*. The third phase shifter 204*c* outputs a phase shifted FMCW signal 100 to a third transmitter 206*c*.

Example FMCW chirps 102 are shown corresponding to each of the first transmitter 206*a*, the second transmitter 206*b*, and the third transmitter 206*c*. The FMCW synthesizer 202 and the first phase shifter 204*a* together generate a first set of chirps 208*a*. The FMCW synthesizer 202 and the second phase shifter 204*b* together generate a second set of chirps 208*b*. The FMCW synthesizer 202 and the third phase shifter 204*c* together generate a third set of chirps 208*c*.

To perform DDMA FMCW transmission, an FMCW signal, such as the FMCW signal 100 of FIG. 1, is phase shifted using phase shift coding that is differentiated in slow time (e.g., between sets of chirps) for different transmitters. In an example, a phase shift coding has sixty-four possible code settings, from zero to sixty-three. Individual code increments represent π/64 radians, so that phase shift ranges from zero radians to $2\pi*{}^{63}\!/_{64}{}^{ths}$ radians. Example phase shift code vectors include [0 16 32 48 0 16 32 48 0] and [0 24 48 8 32 56 16 40 0]. The first phase shift code vector increments by 16, and the second coding vector increments by 24. A phase shift increment corresponding to the code increment of a phase shift code vector is referred to herein as a base phase shift. After eight FMCW chirps 102, the two phase shift code vectors return to the same zero value phase offset, so that they periodically have the same value in fast time. However, the two vectors are differentiated over slow time.

In an example, base phase shift of the first, second, and third phase shifters 204*a*, 204*b*, and 204*c* are, respectively, $\phi 1=0$, $\phi 2=\upsilon$, and $\phi 3=2\upsilon$, where υ is a phase shift corresponding to an integer code value. The transmitters 206*a*, 206*b*, and 206*c* transmit FMCW chirps that have been phase shifted using sequentially increasing multiples of respective base phase shifts. These increasing phase shifts cycle through respective phase shift code vectors.

A DDMA FMCW radar system can be used to implement a multiple-input multiple-output (MIMO) radar system. In a MIMO radar system with a number N transmitters and a number M receivers, the N signals transmitted by the transmitters are predictable and different across different transmitters. In some examples, in DDMA, transmitted signals are differentiated by applying unique Doppler shift sequences per transmitter to respective sets of FMCW chirps 102 to be transmitted. In TDMA, transmitted signals are differentiated by causing each transmitter to transmit signals within time slots that are unique with respect to the other transmitters. In Binary Phase Modulation, each transmitter has a unique phase sequence across slow time, corresponding to sequenced phase shifts of 0° or 180°, which enables signal recovery at the receivers.

A MIMO radar system as described, using signals differentiated across transmitters, enables N different signals to be extracted from each of the signals received by the M receivers, resulting in N×M different received signals, as if the MIMO radar system had N×M different receivers. This enables improved spatial resolution of the radar system. Doppler differentiation can be used to make the N transmitted signals predictable and unique using phase shift vectors that are differentiated from each other in slow time. Because of the property of being able to extract N×M different received signals, a MIMO radar system as described is referred to as having an N×M element virtual antenna array.

Figure 2B:
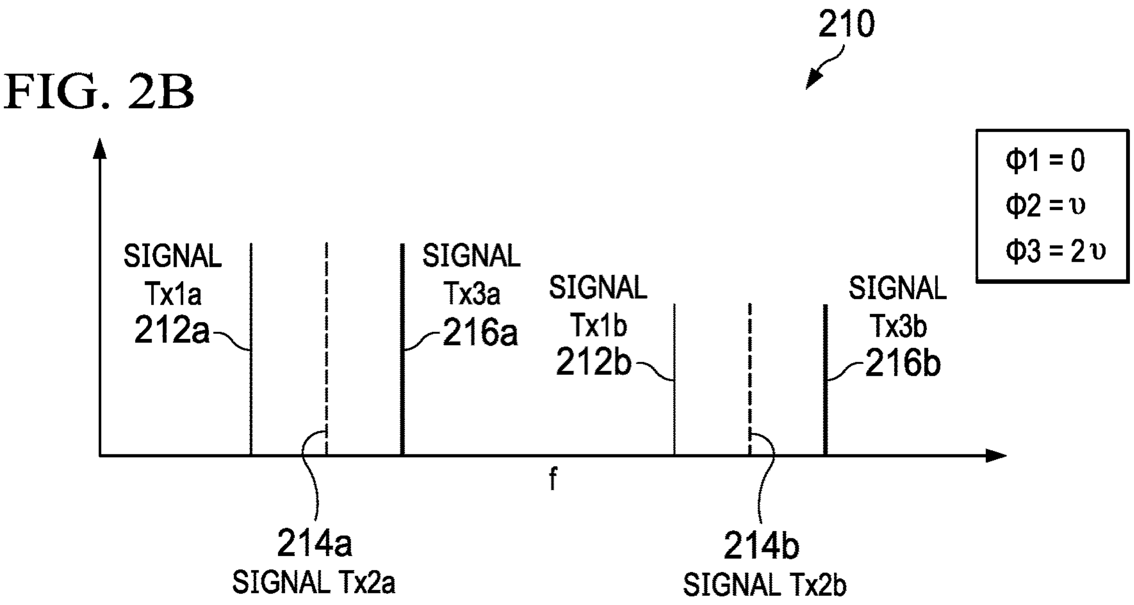
FIG. 2B is a graph of an example received reflected FMCW signal corresponding to the DDMA FMCW transmission of FIG. 2A.

FIG. 2B is a graph of example Doppler shifts of received reflected FMCW chirps 210 corresponding to the DDMA FMCW transmission 200 of FIG. 2A. A horizontal axis corresponds to Doppler shift frequency and a vertical axis corresponds to amplitude. Doppler shift refers to a change in frequency of a signal received by an FMCW radar system (such as the FMCW radar system 300 of FIG. 3) with respect to a corresponding FMCW chirp 102 transmitted by the FMCW radar system. Doppler shifts are caused by relative motion of the FMCW radar system with respect to an object off which the received signal was reflected. FMCW chirps 102 that are transmitted at the same time as phase shifted copies of each other—same base frequency $F_0$ 106, same ramp time 104, and same maximum frequency $F_1$ 108—result in different Doppler shifts. In some examples, if the base phase shift is zero, then the Doppler frequency in a received reflected signal is dependent only on the velocity of the reflecting object. DDMA phase shifting results in Doppler frequencies that are unique per transmitter and that add to the inherent Doppler frequency shift that is dependent solely on velocity.

A Doppler shift of a first received signal (signal Tx1a) 212*a* corresponds to an FMCW chirp 102 of the first set of chirps 208*a*, transmitted by the first transmitter 206*a*. A Doppler shift of a second received signal (signal Tx2a) 214*a* corresponds to an FMCW chirp 102 of the second set of chirps 208*b*, transmitted by the second transmitter 206*b*. A Doppler shift of a third received signal (signal Tx3a) 216*a* corresponds to the third set of chirps 208*c*, transmitted by the third transmitter 206*c*. Signal Tx1a 212*a*, signal Tx2a 214*a*, and signal Tx3a 216*a* are shown grouped together, separated in frequency by relatively small increments corresponding to the separations in phase of the first set of chirps 208*a*, the second set of chirps 208*b*, and the third set of chirps 208*c*. Accordingly, signal Tx1a 212*a*, signal Tx2a 214*a*, and signal Tx3a 216*a* correspond to a first detected object.

Similarly, a Doppler shift of a fourth received signal (signal Tx1b) 212*b* corresponds to an FMCW chirp 102 of the first set of chirps 208*a*, transmitted by the first transmitter 206*a*. A Doppler shift of a fifth received signal (signal Tx2b) 214*b* corresponds to an FMCW chirp 102 of the second set of chirps 208*b*, transmitted by the second transmitter 206*b*. A Doppler shift of a sixth received signal (signal Tx3b) 216*b* corresponds to the third set of chirps 208*c*, transmitted by the third transmitter 206*c*. Signal Tx1b 212*b*, signal Tx2b 214*b*, and signal Tx3b 216*b* are shown grouped together, separated in frequency by relatively small increments corresponding to the separations in phase of the first set of chirps 208*a*, the second set of chirps 208*b*, and the third set of chirps 208*c*. Accordingly, signal Tx1b 212*b*, signal Tx2b 214*b*, and signal Tx3b 216*b* correspond to a second detected object.

Figure 3:
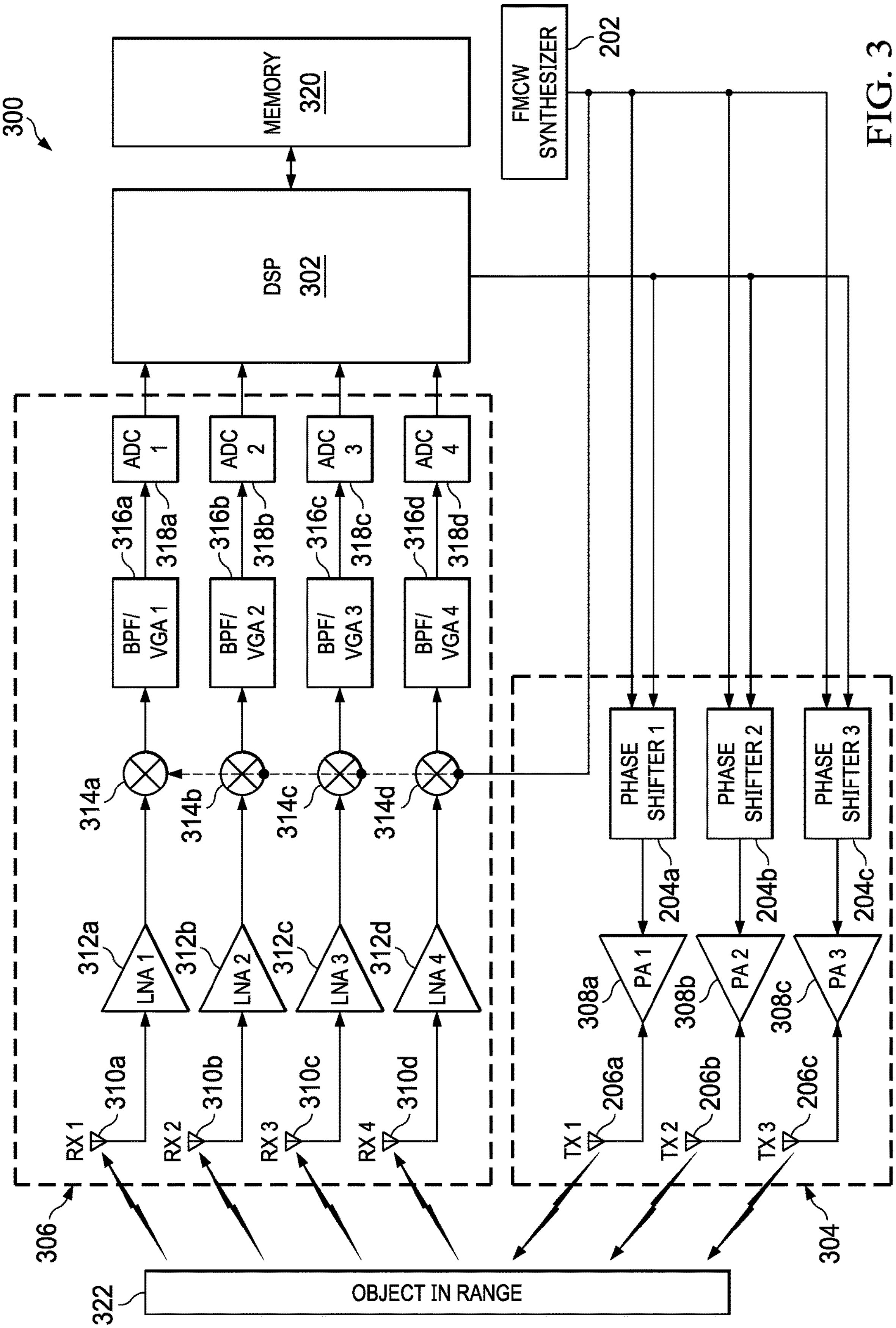
FIG. 3 is a functional block diagram of an example FMCW radar system for transmitting a DDMA FMCW transmission as shown in FIG. 2A, and receiving reflected FMCW chirps as shown in FIG. 2B.

FIG. 3 is a functional block diagram of an example FMCW radar system 300 for transmitting a DDMA FMCW transmission 200 as shown in FIG. 2A, and receiving reflected FMCW chirps 210 as shown in FIG. 2B. In some examples, a DDMA FMCW radar system, or an FMCW radar system using another type of transceiver protocol (such as TDMA or Binary Phase Modulation), uses different functional blocks. In some examples, the FMCW radar system 300 is configured to use millimeter wave sensing or sub-terahertz (sub-THz) sensing. In some examples, an FMCW radar system 300 that uses millimeter wave sensing transmits FMCW chirps 102 in a 60 gigahertz or 77 gigahertz band. In some examples, an FMCW radar system 300 that uses sub-THz sensing transmits FMCW chirps 102 in a 140 gigahertz (GHz) or higher band.

The FMCW radar system 300 includes an FMCW synthesizer 202, a digital signal processor (DSP) 302, a transmitter side 304, a receiver side 306, and a memory 320. The transmitter side 304 of the FMCW radar system 300 includes a first phase shifter (phase shifter 1) 204*a*, a second phase shifter (phase shifter 2) 204*b*, and a third phase shifter (phase shifter 3) 204*c*; a first power amplifier (PA1) 308*a*, a second power amplifier (PA2) 308*b*, and a third power amplifier (PA3) 308*c*; and a first transmitter (TX1) 206*a*, a second transmitter (TX2) 206*b*, and a third transmitter (TX3) 206*c*.

The receiver side 306 of the FMCW radar system 300 includes a first receiver (RX1) 310*a*, a second receiver (RX2) 310*b*, a third receiver (RX3) 310*c*, and a fourth receiver (RX4) 310*d*; a first low noise amplifier (LNA1) 312*a*, a second low noise amplifier (LNA2) 312*b*, a third low noise amplifier (LNA3) 312*c*, and a fourth low noise amplifier (LNA4) 312*d*; a first mixer 314*a*, a second mixer 314*b*, a third mixer 314*c*, and a fourth mixer 314*d*; a first band pass filter (BPF) and variable gain amplifier (VGA) circuit (BPF/VGA 1) 316*a*, a second BPF and VGA circuit (BPF/VGA 2) 316*b*, a third BPF and VGA circuit (BPF/VGA 3) 316*c*, and a fourth BPF and VGA circuit (BPF/VGA 4) 316*d*; a first analog-to-digital converter (ADC) circuit (ADC 1) 318*a*, a second ADC circuit (ADC 2) 318*b*, a third ADC circuit (ADC 3) 318*c*, and a fourth ADC circuit (ADC 4) 318*d*.

The FMCW synthesizer 202 generates FMCW chirps 102 to be transmitted, such as for object detection and range, angle, and velocity determination. The FMCW synthesizer 202 outputs the FMCW chirps 102 to respective first inputs of the first, second, and third phase shifters 204*a*, 204*b*, and 204*c*, and also to respective first inputs of the first, second, third, and fourth mixers 314*a*, 314*b*, 314*c*, and 314*d*. The first, second, and third phase shifters 204*a*, 204*b*, and 204*c* phase shift the FMCW chirps 102 using respective phase shift code vectors, as described with respect to FIG. 2A.

The first, second, and third phase shifters 204*a*, 204*b*, and 204*c* output the FMCW chirps 102 to, respectively, the first, second, and third power amplifiers PA1 308*a*, PA2 308*b*, and PA3 308*c*. The first, second, and third power amplifiers PA1 308*a*, PA2 308*b*, and PA3 308*c* amplify the respective phase shifted FMCW chirp signals, and output the amplified signals to, respectively, the first, second, and third transmitters 206*a*, 206*b*, and 206*c*. The first, second, and third transmitters 206*a*, 206*b*, and 206*c* transmit the amplified, phase shifted FMCW chirps. In some examples, the transmitted signals are reflected by an object 322 that is within the FOV and the detection and range, angle, and velocity determination range of the FMCW radar system 300 (object in range 322).

The reflected signals are received by the first, second, third, and fourth receivers 310*a*, 310*b*, 310*c*, and 310*d*. The first, second, third, and fourth receivers 310*a*, 310*b*, 310*c*, and 310*d* output the received signals to, respectively, the first, second, third, and fourth low noise amplifiers LNA1 312*a*, LNA2 312*b*, LNA3 312*c*, and LNA4 312*d*, which amplify the received signals. The first, second, third, and fourth low noise amplifiers LNA1 312*a*, LNA1 312*b*, LNA1 312*c*, and LNA4 312*d* output the amplified signals to second inputs of, respectively, the first, second, third, and fourth mixers 314*a*, 314*b*, 314*c*, and 314*d*. The first, second, third, and fourth mixers 314*a*, 314*b*, 314*c*, and 314*d* output the mixed signals to, respectively, the first, second, third, and fourth BPF/VGA circuits 316*a*, 316*b*, 316*c*, and 316*d*, which filter and amplify the mixed signals. The first, second, third, and fourth BPF/VGA circuits 316*a*, 316*b*, 316*c*, and 316*d* output the resulting cleaned signals to, respectively, the first, second, third, and fourth ADC circuits 318*a*, 318*b*, 318*c*, and 318*d*, which sample the cleaned mixed signals to generate respective data sets made up of digital samples. The first, second, third, and fourth ADC circuits 318*a*, 318*b*, 318*c*, and 318*d* output the digital samples to the DSP 302 for analysis.

The DSP 302 uses the digital samples to determine presence, range, angle, and velocity of the object in range 322. Herein, object in range refers to an object that is both within a shared field of view (FOV) of FMCW transmitters 206 and corresponding FMCW receivers 310, and within a designed range over which a corresponding FMCW radar system (such as the FMCW radar system 300 of FIG. 3) can detect objects using received reflected FMCW signals.

For example, presence of an object may be determined based on a signal amplitude greater than a threshold. Range may be determined by a unique range frequency corresponding to the signal's round trip delay multiplied by the FMCW chirp 102 slope. Velocity may be determined by the phase variation of the unique range frequency over multiple chirps, which manifests as a unique Doppler frequency. Angle may be determined by the phase variation for a particular received chirp across different receivers, caused by the difference in time of flight across the different receivers. These determinations are further discussed with respect to FIGS. 4 and 5.

Figure 4:
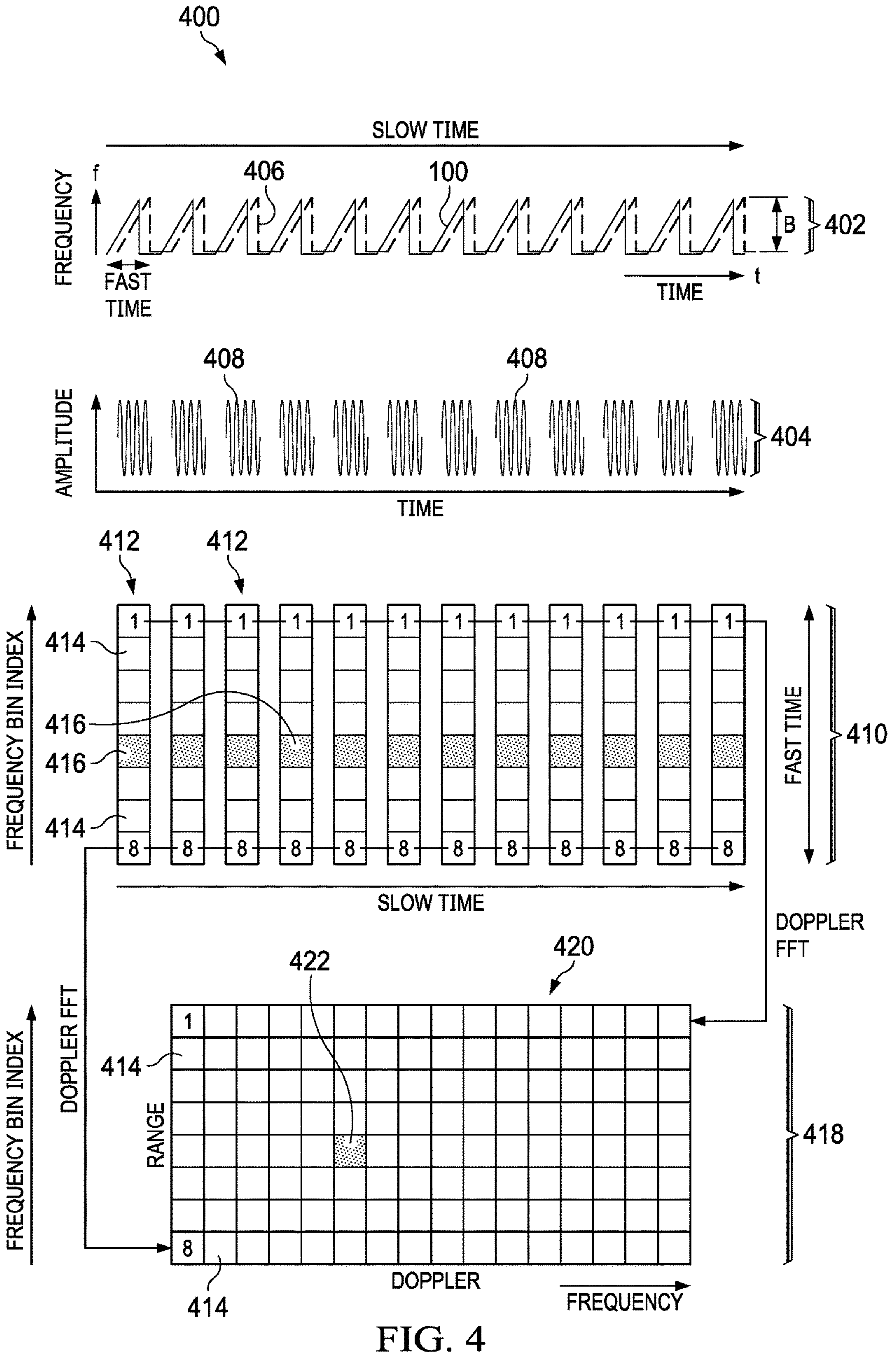
FIG. 4 illustrates a process for determining range and velocity using FMCW chirps transmitted and received by the FMCW radar system of FIG. 3.

FIG. 4 illustrates a process 400 for determining range and velocity using FMCW chirps 102 transmitted and received by the FMCW radar system 300 of FIG. 3. For step 402, the horizontal axis indicates time, and the vertical axis indicates frequency. For step 404, the horizontal axis indicates time, and the vertical axis indicates amplitude. In step 402, an FMCW signal 100 is transmitted, and a received FMCW signal 406 is received. Individual FMCW chirps 102 are transmitted and received in fast time. The FMCW signal 100 is transmitted, and the received FMCW signal 406 is received, in slow time.

The amount of time for a transmitted signal to reach the object in range 322 equals d. The time for the reflected signal to return from the object in range 322 and be received by the first, second, third, and fourth receivers 310*a*, 310*b*, 310*c*, and 310*d* also equals d. Accordingly, the time of flight of an FMCW chirp 102 reflected by the object in range 322 is 2d. In some examples, the value of d varies in response to the distinct locations of different ones of the transmitters 206 and/or the distinct locations of the receivers 310. This varying value of d manifests in the signals received by the different receivers 310 as a phase variation that is used to perform angle estimation. Further, as discussed with respect to FIG. 2B, received FMCW chirps 102 are Doppler shifted relative to corresponding transmitted FMCW chirps 102 depending on motion of the FMCW radar system 300 relative to the object in range 322 from which the received FMCW chirps 102 are reflected, and depending on phase shift applied by a corresponding one of the first, second, or third phase shifter 204*a*, 204*b*, or 204*c*.

In step 404, the first, second, third, and fourth mixers 314*a*, 314*b*, 314*c*, and 314*d* mix (for example, multiply) respective received signals with the FMCW signal 100 generated by the FMCW synthesizer 202 to produce intermediate frequency (IF) signals 408. Accordingly, the IF signal 408 is the product of mixing the received signal with the transmitted signal. The frequency of the IF signal 408 is linearly proportional to the time of flight, 2d, of the corresponding FMCW chirp 102. As described with respect to FIG. 3, the first, second, third, and fourth ADCs 318*a*, 318*b*, 318*c*, and 318*d* sample these IF signals 408 after they are cleaned and amplified, and provide the resulting digital samples to the DSP 302 for analysis. In step 410, the DSP 302 performs a fast Fourier transform (FFT) on sets of the digital samples in fast time. This means that FFTs are determined for sets of samples of IF signals 408 (received signals mixed with transmitted signals), so that the sets of samples are aligned to respective PRIs 112. This produces a series of one dimensional range FFTs 412 that are sequential in time.

The range FFTs 412 are divided into frequency bins 414. Each frequency bin 414 covers a separate Doppler shift frequency range and has an index indicating a range to the object and a value indicating a return signal strength associated with the respective range. The number of frequency bins 414 in respective range FFTs 412 corresponds to a frequency resolution of the FMCW radar system 300. Frequency resolution of the FMCW radar system 300 corresponds to range and velocity resolution of the FMCW radar system 300.

In the illustrated example, there are eight frequency bins 414 in each range FFT 412. In some examples, a range FFT 412 includes hundreds of frequency bins. If an object in range 322 is present, over a period of time, to reflect the transmitted FMCW chirps 102, there will be an amplitude spike 416. The amplitude spike 416 is shown in FIG. 4 as a shaded box in frequency bins 414 of the range FFTs 412. The amplitude spike 416 corresponds to the distance of the object in range 332 from the receiver (the first, second, third, or fourth receiver 310*a*, 310*b*, 310*c*, or 310*d*) that received the FMCW signal 100 being analyzed. The range FFTs 412 with this amplitude spike 416 correspond to the intermediate frequency indicating the presence of the object in range 322.

In step 418, the DSP 302 performs an FFT on the one dimensional range FFTs, in slow time. Accordingly, the DSP 302 performs an FFT on a temporally sequential set of the one dimensional range FFTs 412 to produce a two dimensional range-Doppler FFT 420. The range-Doppler FFT 420 includes a set of bins that each has (1) an index that represents a combination of range and velocity, and (2) a value indicating a return signal strength associated with the respective range and velocity. The range-Doppler FFT 420 covers a number of PRIs 112 determined in response to a designed velocity resolution; in some examples, this corresponds to one data frame 116. A vertical dimension of the range-Doppler FFT 420, corresponding to fast time (an individual PRI 112 with respect to a corresponding one of the transmitters 206), is divided into frequency bins 414 indicating range. The vertical dimension of the range-Doppler FFT 420 is also referred to as the range domain of the range-Doppler FFT 420. A horizontal dimension of the range-Doppler FFT 420, corresponding to slow time (across the selected number of PRIs 112), is divided into frequency bins 414 indicating Doppler shift. The horizontal dimension of the range-Doppler FFT 420 is also referred to as the Doppler domain of the range-Doppler FFT 420. In some examples, the selected number of PRIs 112 covers a few tens of milliseconds.

An amplitude spike 422 (darkened box) in the range-Doppler FFT 420 indicates the presence of an object in range 322. A vertical coordinate of the particular frequency bin 414 in which the amplitude spike 422 is located indicates the range of the object in range 322 from the FMCW radar system 300. A horizontal coordinate of the particular frequency bin 414 in which the amplitude spike 422 is located provides Doppler shift information. The Doppler shift information represented by the an amplitude spike 422 in the range-Doppler FFT 420 can be used to determine the speed of the object in range 322 relative to the FMCW radar system 300. In an example, the determined speed is an average speed over the selected number of PRIs 112 used to generate the range-Doppler FFT 420.

Figure 5:
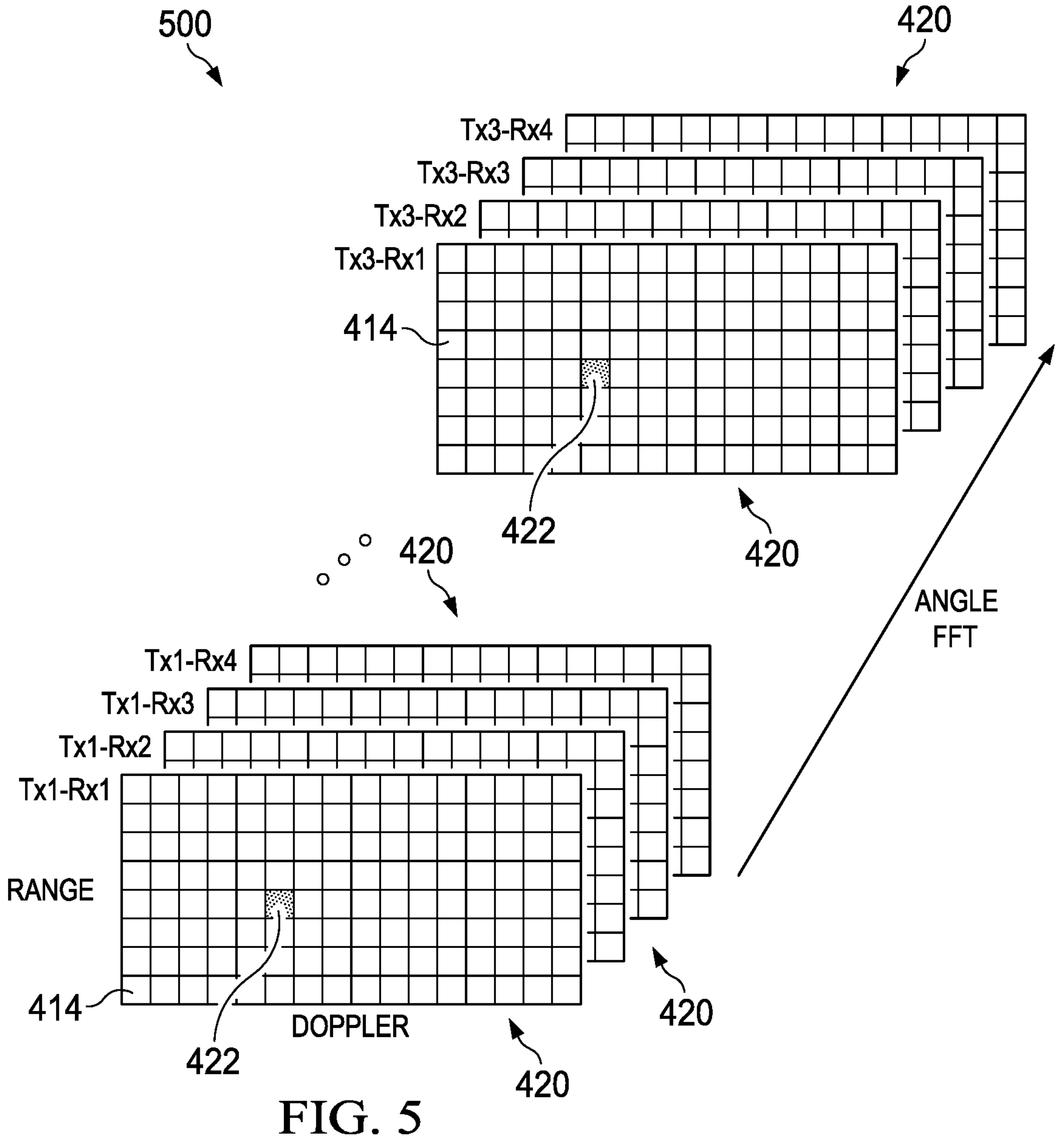
FIG. 5 illustrates a set of two dimensional fast Fourier transforms (FFTs) generated by applying the process of FIG. 4 to DDMA FMCW signals received by the first, second, third, and fourth receivers of FIG. 3.

FIG. 5 illustrates a set 500 of range-Doppler FFTs 420 generated by applying the process 400 of FIG. 4 to DDMA FMCW signals received by the first, second, third, and fourth receivers 310*a*, 310*b*, 310*c*, and 310*d* of FIG. 3. As described above, using differentiated phase shift vectors applied to the first, second, and third phase shifters 204*a*, 204*b*, and 204*c* in slow time enables FMCW signals 100 transmitted by a number N transmitters, and received by a number M receivers, to be treated as N×M separate received signals. For each of the M receivers, an object in range 322 will appear as N different peaks in the range FFTs 412. This increases the spatial resolution of the FMCW radar system 300.

In the example illustrated in FIG. 3, the FMCW radar system 300 has three transmitters and four receivers. Accordingly, applying the process 400 to the FMCW radar system 300 results in twelve received signals, which can also be viewed as twelve objects to be resolved. A disambiguation step, also referred to as transmitter decoding, is performed to distinguish the twelve objects, and then the corresponding range FFTs 412 are processed to generate twelve range-Doppler FFTs 420. Different ones of the distinguished objects correspond to different combinations of the first, second, or third transmitter 206*a*, 206*b*, or 206*c*, and the first, second, third, or fourth receiver 310*a*, 310*b*, 310*c*, or 310*d*, so that different ones of the range-Doppler FFTs 420 correspond to different transmitter-receiver combinations. The range-Doppler FFTs 420 are identified according to the transmitter and the receiver to which they correspond. For example, a range-Doppler FFT 420 corresponding to the first transmitter (TX1) 206*a* and the third receiver (RX3) 310*c* is identified as TX1-RX3, and a range-Doppler FFT 420 corresponding to the third transmitter (TX3) 206*c* and the second receiver (RX2) 310*b* is identified as TX3-RX2.

As described above, by using range-Doppler FFTs 420 corresponding to multiple different receivers, an angle of the object in range 322 with respect to an orientation of the FMCW radar system 300 (angle of arrival) can be determined. For example, two receivers can be used to determine an angle in a single plane, which can be combined with a range to generate a two dimensional location of the object in range 322. For example, two receivers can be used to determine range and azimuth of the object in range 322. Similarly, three receivers can be used to determine angles in multiple planes, which can be combined with the range to determine a three dimensional location of the object in range 322. For example, three receivers can be used to determine range, azimuth, and elevation of the object in range 322.

An accuracy with which angle information of the object in range 322 is determined is limited by the number of antennas used to receive the reflected signals. In a MIMO radar system, this limitation corresponds to a number of virtual antennas in the virtual antenna array.

FIG. 6 is a functional block diagram of another example FMCW radar system 600. The FMCW radar system 600 includes a reference clock generator 602, a receiver signal chain 604, a synthesizer phase locked loop (PLL) 606, a pulse generator 608, an accumulator 610, a sigma delta modulator (SDM) 612, a synchronization state machine 614, and a reference signal generator 616. The reference clock generator 602 includes an analog PLL (APLL) 618 and a divider 620. The reference signal generator 616 is, for example, a crystal oscillator or other frequency reference that generates a reference signal with a reference frequency. The reference signal generator 616 is coupled to the APLL 618, and accordingly, provides the reference signal to the reference clock generator 602. The pulse generator 608 includes a divider 609.

The receiver signal chain 604 includes the receiver 310, the low noise amplifier 312, the mixer 314, IF amplifier (IFA) 615, and ADC 318. In some examples, the IFA 615 is a BPF/VGA 316. The ADC 318 receives REFCLK 702, and uses it to determine sampling times for IF signals 408.

The synthesizer PLL 606 includes a phase frequency detector (PFD) 622, charge pump (CP) 624, low pass filter (LPF) 626, voltage controlled oscillator (VCO) 628, and feedback (FB) divider 630. The synchronization state machine 614 includes a synchronizer 632, a first rising edge detector 634, a second rising edge detector 636, a memory control circuit 637, a circular first-in-first-out (FIFO) memory 638, and a multiplexer 640.

In some examples, the receiver signal chain 604 corresponds to the receiver side 306, and the reference clock generator 602, synthesizer PLL 606, pulse generator 608, accumulator 610, SDM 612, and synchronization state machine 614 correspond to the FMCW synthesizer 202.

The reference signal provided by the reference signal generator 616 is locked to by the APLL 618, which is divided down by the divider 620 to generate a reference clock signal (REFCLK) 702 (see FIG. 7) used by the FMCW radar system 600 for control and to generate various other clock signals. The reference clock generator 602 is connected to provide REFCLK 702 to the ADC 318, the pulse generator 608, a reference clock input of the synchronization state machine 614, and a first input of the PFD 622. In an example, a frequency of REFCLK 702 is 400 megahertz (MHz).

The PFD 622 receives REFCLK 702 (at a second input of the PFD 622), along with a feedback clock signal (FBCLK) provided by the FB divider 630. The PFD 622 is connected to provide phase difference information to the charge pump 624. The CP 624 generates a frequency control signal, which it outputs to the LPF 626. The LPF 626 filters the frequency control signal and passes it to the VCO 628. The VCO 628 provides a PLL Output Signal with a frequency responsive to the frequency control signal. The PLL Output Signal is provided to other circuits of the FMCW synthesizer 202 for FMCW chirp 102 generation, and to the FB divider 630.

The FB divider 630 outputs FBCLK 704 with a frequency equal to the frequency of the PLL Output Signal divided by a divisor N, so that the frequency of the PLL Output Signal equals the frequency of FBCLK 704 multiplied by N. As further described below, the divisor N is controlled by the SDM 612 to ramp FMCW chirp frequency, forming a sloped FMCW chirp 102 (see FIG. 1). When the synthesizer PLL 606 is locked to REFCLK 702, the frequency of FBCLK 704 equals the frequency of REFCLK 702. The FB divider 630 provides FBCLK 704 to a clock input of the accumulator 610, a clock input of the SDM 612, a feedback clock input of the synchronization state machine 614, and the second input of the PFD 622.

The pulse generator 608 generates a chirp start pulse 706, at a programmed time responsive to REFCLK 702 and to an integer divisor L set by the divider 609, to start generation of an FMCW chirp 102. Accordingly, the pulse generator 608 provides chirp start pulses 706 that are a multiple of L cycles of REFCLK 702 apart. In an example, the chirp start pulse 706 is a 10 nanosecond (ns) pulse and the divisor L equals four.

The pulse generator 608 is connected to provide the chirp start pulse 706, via the synchronization state machine 614, to a control input of the accumulator 610 to trigger the accumulator 610 to start a count. The accumulator 610 provides this count to the SDM 612 to ramp the divisor N. In response to the divisor N ramping, the FB divider 630 causes the synthesizer PLL 606 to ramp a frequency of the PLL Output Signal to enable generation of an FMCW chirp 102. Accordingly, a chirp start pulse 706 from the pulse generator 608 starts a frequency ramp corresponding to generation of an FMCW chirp 102.

Specifically, the pulse generator 608 is connected to provide the Chirp Start Pulse 706 to the synchronizer 632 and to the second rising edge detector 636. The synchronizer 632 synchronizes a Chirp Start Pulse 706 provided by the pulse generator 608, which is in a REFCLK 702 clock domain, with a FBCLK 704 clock domain. Accordingly, a rising edge of the output of the synchronizer 632 is synchronized with a rising edge of a FBCLK 704 clock pulse. The synchronizer 632 is connected to output the synchronized Chirp Start Pulse 706 to the first rising edge detector 634.

In some examples, the synchronizer 632 is a two stage synchronizer including a first latch clocked by REFCLK 702 that outputs to a second latch clocked by FBCLK 704 (latches are not shown). The first latch receives a data input of the synchronizer 632, and the second latch provides a data output of the synchronizer 632. Function of the synchronizer 632 is further described with respect to FIG. 7. An example synchronizer 632 is described with respect to FIG. 9.

The first rising edge detector 634 outputs a signal indicating a detected synchronized Chirp Start Pulse 706 to a first data input of the multiplexer 640. The second rising edge detector 636 outputs a signal indicating a detected Chirp Start Pulse 706 (without synchronization) to a second input of the memory control circuit 637. The memory control circuit is connected to communicate with the circular FIFO memory 638, including to control writes to and reads from the circular FIFO memory 638, and to provide data to write to and to receive data read from the circular FIFO memory 638. The circular FIFO memory 638 has M memory cells (in some examples, M distinctly addressed memory locations). The memory control circuit 637 outputs to a second data input of the multiplexer 640. The multiplexer 640 has a control input that receives a Mode Select signal 722 responsive to whether the synthesizer PLL 606 has phase locked to REFCLK 702.

In some examples, the Mode Select signal 722 is provided responsive to a software process, a hardware process, or a hybrid process (for example, a firmware process) of a processor that controls the FMCW radar system 600, such as the DSP 302. In some examples, the process providing the Mode Select signal 722 includes an estimate for the amount of time required for the synthesizer PLL 606 to phase lock to REFCLK 702, such as an upper bound of the time to lock.

The multiplexer 640 outputs to the control input of the accumulator 610 to trigger the accumulator 610 to start the count corresponding to frequency ramp of an FMCW chirp 102. The multiplexer 640 outputs either the signal received by its first data input or by its second data input in response to the Mode Select signal 722. The Mode Select signal 722 controls the multiplexer 640 to output the signal at its first data input, corresponding to the output of the first rising edge detector 634, while the synthesizer PLL 606 is not locked to REFCLK 702. The Mode Select signal 722 controls the multiplexer 640 to output the signal at its second data input, corresponding to the output of the second rising edge detector 634, while the synthesizer PLL 606 is locked to REFCLK 702.

The ADC 318 and the pulse generator 608 are clocked by REFCLK 702, rather than FBCLK 704, so that sampling of IF signals 408 by the ADC 318 and timing of FMCW chirp 102 generation (respectively) is performed using a fixed, unmodulated reference clock. The divisor N, corresponding to a feedback divider ratio of the synthesizer PLL 606, is updated on a FBCLK 704 clock edge because use of REFCLK 702 to clock the accumulator 610 or the SDM 612 could cause the synthesizer PLL 606 to exit a locked state due to FB divider 630 metastability. In some examples, the synthesizer PLL 606 exiting the locked state prevents generation of an FMCW chirp 102 with accurate start frequency ($F_0$ 106) and slope.

Figure 7:
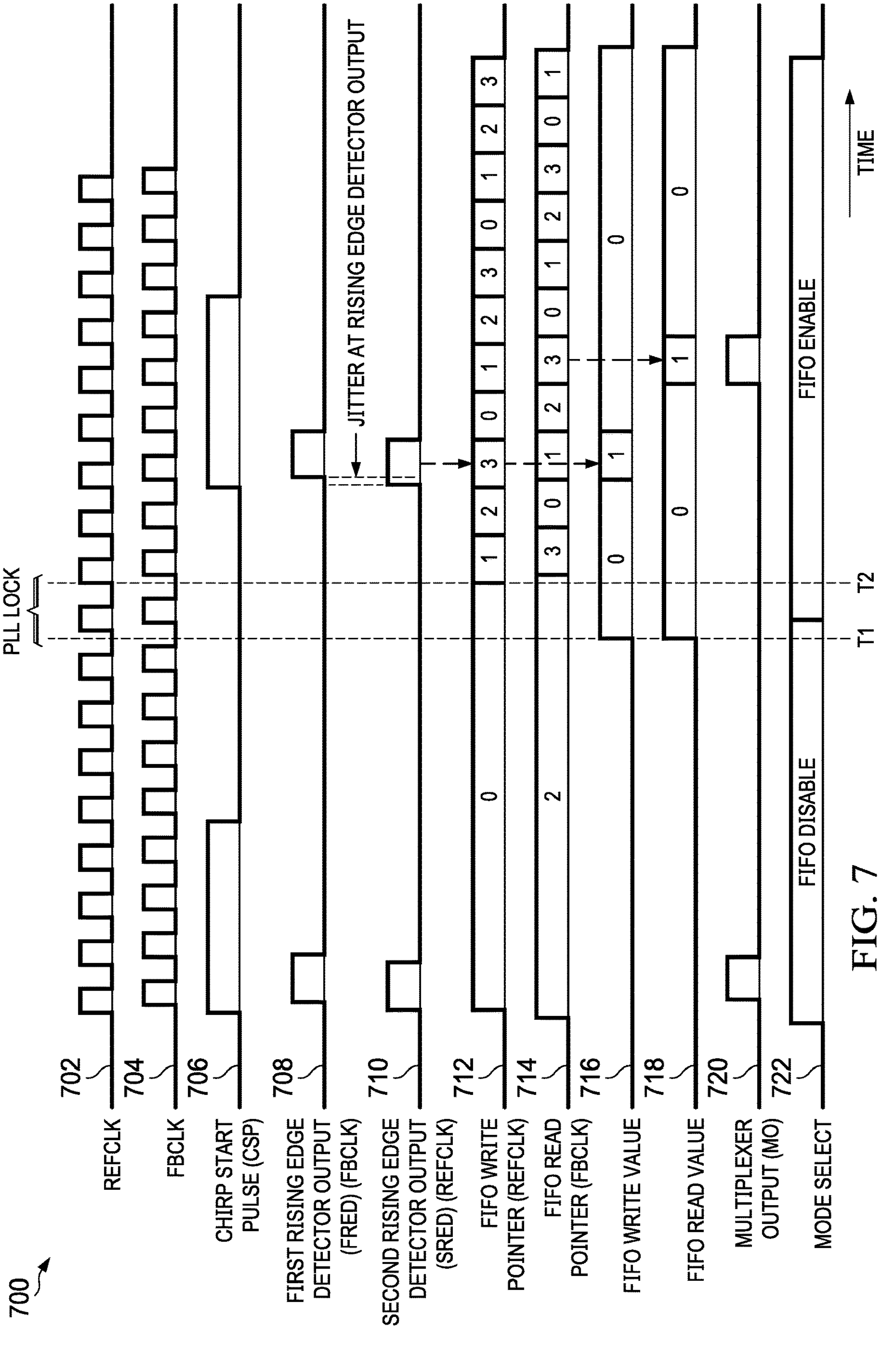
FIG. 7 is a timing diagram of example signals of the FMCW radar system of FIG. 6.

FIG. 7 is a timing diagram 700 of example signals of the FMCW radar system 600 of FIG. 6. The timing diagram 700 shows REFCLK 702, FBCLK 704, the Chirp Start Pulse 706, the first rising edge detector output signal 708 (which is in the FBCLK clock domain), the second rising edge detector output signal 710 (which is in the REFCLK clock domain), the FIFO write pointer 712 (which is clocked by REFCLK), the FIFO read pointer 714 (which is clocked by FBCLK), a FIFO write value 716, a FIFO read value 718, the multiplexer output signal 720, and the FIFO Enable Signal 722. As described above, in response to the Chirp Start Pulse 706 the multiplexer output signal 720 provides an accumulator trigger pulse that causes the accumulator to start its count.

The memory control circuit 637 controls writes to the circular FIFO memory 638 using a write pointer, a value of which is indicated by the FIFO Write Pointer signal 712. The memory control circuit 637 controls reads from the circular FIFO memory 638 using a read pointer, a value of which is indicated by the FIFO Read Pointer signal 714. Different pointer values correspond to different cells of the M cell circular FIFO memory 638. The write pointer and the read pointer can each have M values. In the example, M equals four, and the write and read pointers can equal zero, one, two, or three.

Initially, prior to T1, the synthesizer PLL 606 is not locked to REFCLK 702, the value of the FIFO write pointer 712 is zero, and the value of the FIFO read pointer 714 is M/2, which equals two in the illustrated example (M equals four). In some examples, the particular values of the FIFO write pointer 712 and the FIFO read pointer 714 when the synthesizer PLL 606 locks are not important. Integer increments that separate the two values correspond to clock periods: after the synthesizer PLL 606 locks, the FIFO write pointer 712 is incremented on each rising edge of REFCLK 702, and the FIFO read pointer 714 is incremented on each rising edge of FBCLK 704. It is important that the two values are separated by sufficient integer increments, corresponding to clock periods, that phase differences between REFCLK 702 and FBCLK 704 do not result in race conditions related to operations dependent on the FIFO write pointer 712 and the FIFO read pointer 714. Accordingly, the values of the two pointers 712 and 714 are separated by M/2. In some examples, the separation can be other than M/2.

Prior to T1, the Mode Select signal 722 has the FIFO Disable value. The FIFO Disable value of the Mode Select signal 722 causes the multiplexer 640 to pass the First Rising Edge Detector Output signal 708 to the accumulator 610, and causes the FIFO write pointer 712 and FIFO read pointer 714 values not to increment.

In some examples, the FMCW radar system 600 includes a first mode corresponding to the synthesizer PLL 606 not being locked and corresponding to the Mode Select signal 722 having the FIFO Disable value. In the first mode, functional blocks of the FMCW radar system 600 are initialized. Initializing functional blocks of the FMCW radar system 600 includes generating and/or transmitting a zero-slope (constant frequency) FMCW signal at the base frequency $F_0$ for FMCW chirps 102 (see FIG. 1) to prepare for generation of the first FMCW chirp 102 of a data frame 116. The FMCW radar system 600 is in the first mode prior to T1. In the first mode, if the pulse generator 608 outputs the Chirp Start Pulse 706 with a rising edge, then the First Rising Edge Detector Output signal 708 causes the accumulator 610 to begin generation of the zero-slope FMCW signal.

A first example below describes function of the FMCW radar system 600 without using the circular FIFO memory 638. A second example describes function of the FMCW radar system 600 using the circular FIFO memory 638.

In the first example, the output of the first rising edge detector 634 is directly connected to the control input of the accumulator 610 (the circular FIFO memory 638 is not used). The synthesizer PLL 606 exits lock after each FMCW chirp 102 is generated, and re-locks to generate each new FMCW chirp 102. The synchronizer 632 outputs the Chirp Start Pulse 706 provided by the pulse generator 608, synchronized with FBCLK 704 (as described), with a random delay, or jitter. In some examples, this delay corresponds to (randomly) zero, one, or more cycles of FBCLK 704 and/or REFCLK 702. In some examples, this delay is responsive to process, voltage, and temperature (PVT) factors, but remains random across different FMCW chirps 102 when PVT factors are held constant.

The delay caused by the synchronizer 632 may introduce a race condition: depending on how the delayed output of the first rising edge detector 634 interacts with FBCLK 704 when they are received by the accumulator 610, the beginning of the count by the accumulator 610 may be delayed by one or more FBCLK 704 clock cycle(s). That is, the random synchronizer 632 delay may cause the beginning of an FMCW chirp 102 to be randomly delayed. Random FMCW chirp 102 start times randomize inter-chirp delay within data frames 116. Inter-chirp delay corresponds to a duration from the end of one FMCW 102 chirp generated for transmission by the transmitters 206 to the beginning of the next FMCW chirp 102 generated for transmission by the transmitters 206. Randomized inter-chirp delay reduces a range and resolution of FMCW radar system 600 velocity measurements.

In the second example, the circular FIFO memory 638 is connected as shown in and described with respect to FIG. 6. The synthesizer PLL 606 locks to REFCLK 702 at the beginning of a data frame 116, corresponding to the time frame T1 to T2. The synthesizer PLL 606 maintains lock throughout the data frame 116. While the synthesizer PLL 606 is locked to REFCLK 702, the frequency of FBCLK 704 equals the frequency of REFCLK 702 and there is a constant phase delay between REFCLK 702 and FBCLK 704. Also, the Mode Select signal 722 transitions to the FIFO Enable value.

After T2, following a delay after the memory control circuit 637 receives the Mode Select signal 722 with the FIFO Enable value, the memory control circuit 637 increments the write pointer in response to a rising edge of REFCLK 702, and increments the read pointer in response to a rising edge of FBCLK 704. While the Mode Select signal 722 has the FIFO Enable value, the memory control circuit 637 reads the circular FIFO memory 638 at a memory location indicated by the FIFO read pointer 714 in response to each rising edge of FBCLK 704, and the memory control circuit 637 writes the circular FIFO memory 638 at a memory location indicated by the FIFO write pointer 712 in response to each rising edge of REFCLK 702. Initially, the circular FIFO memory 638 stores only logic zero, and the memory control circuit 637 writes a logic zero to the circular FIFO memory 638 by default. Accordingly, a logic zero is read out of the circular FIFO memory 638 in response to each rising edge of FBCLK 704, except for a rising edge of FBCLK 704 responsive to a Chirp Start Pulse 706 as described below.

Generation of an FMCW chirp 102 of the data frame 116 by the FMCW synthesizer 202 in response to a Chirp Start Pulse 706 is now described. In some examples, each FMCW chirp 102 of the data frame 116 can be (or is) generated in the same way. The second rising edge detector 636 detects a rising edge of the Chirp Start Pulse 706 and, in response, provides the Second Rising Edge Detector Output signal 710 with a rising edge to the memory control circuit 637.

In response to the rising edge of the Second Rising Edge Detector Output signal 710, the memory control circuit 637 causes a cell of the circular FIFO memory 638 indicated by the contemporaneous value of the FIFO write pointer 712 to store a logic one. In the illustrated example, the value of the FIFO write pointer 714 is three when the memory control circuit 637 receives the rising edge of the Second Rising Edge Detector Output signal 710. Accordingly, a logic one is stored in a fourth cell of the circular FIFO memory 638 (the read and write pointers increment from zero to three).

As described above, the memory control circuit 637 causes a cell of the circular FIFO memory 638 indicated by the FIFO read pointer 714 to be read, and causes the FIFO read pointer 714 to be incremented, in response to each rising edge of FBCLK 704 while the Mode Select signal 722 has the FIFO enable value. Accordingly, a logic one will be read out of the circular FIFO memory 638 when the FIFO read pointer 714 equals three. This logic one is provided to the multiplexer 640. The Multiplexer Output signal 720 with a value corresponding to logic one is provided to the accumulator 610, via the multiplexer 640, to initiate frequency ramp to generate an FMCW chirp 102 of the data frame 116.

Because a write stores a logic zero in the circular FIFO memory 638 by default, the circular FIFO memory 638 stores only zeroes during periods when a Chirp Start Pulse 706 has not been provided. This includes between FMCW chirps 102 and between data frames 116.

The synchronization state machine 614 enables delay to be the same between receipt of each Chirp Start Pulse 706 of a data frame 116 by the synchronization state machine 614 and output of the corresponding signal to the accumulator 610 triggering generation of an FMCW chirp 102. First, the synthesizer PLL 606 remains locked throughout the data frame 116. Because the synthesizer PLL 606 remains locked, the phase delay between REFCLK 702 and FBCLK 704 is the same throughout the data frame 116, so that the phase delay between the write pointer incrementing and the read pointer incrementing is constant throughout the data frame 116.

The phase delay between the write pointer incrementing and the read pointer incrementing may result in the logic one being read one clock cycle of FBCLK 704 sooner or later than the expected M/2 clock cycle write-then-read delay. This +/− clock cycle shift in the signal triggering the accumulator 610 is referred to as an offset (which can also equal zero cycles). Because the phase delay between the write and read pointers incrementing is constant throughout the data frame 116, the offset is constant throughout the data frame 116. (In some examples, M is chosen in response to a maximum value of the offset, to avoid race conditions between the write pointer and the read pointer.) Because the offset is constant, the inter-chirp delay is constant. In the illustrated example, there will be a two (M/2) cycle delay, plus the offset, from the FIFO Read Pointer signal 714 indicating a one to indicating a three, for each FMCW chirp 102 of the corresponding data frame 116.

Second, the write and read pointers and the circular FIFO memory 638 are not reset during the data frame 116. Accordingly, write timing relative to read timing does not change during the data frame 116, so the offset remains constant throughout the data frame 116.

In some examples, between data frames 116, the synthesizer PLL 606 exits the lock state, the Mode Select signal 722 transitions to the FIFO Disable value, and the cells of the circular FIFO memory 638 are written with logic zero values. In some examples, the particular values of the write and read pointers at the beginning of a data frame 116 do not matter, so long as they are sufficiently separated to avoid race conditions, such as race conditions related to the offset.

Figure 8:
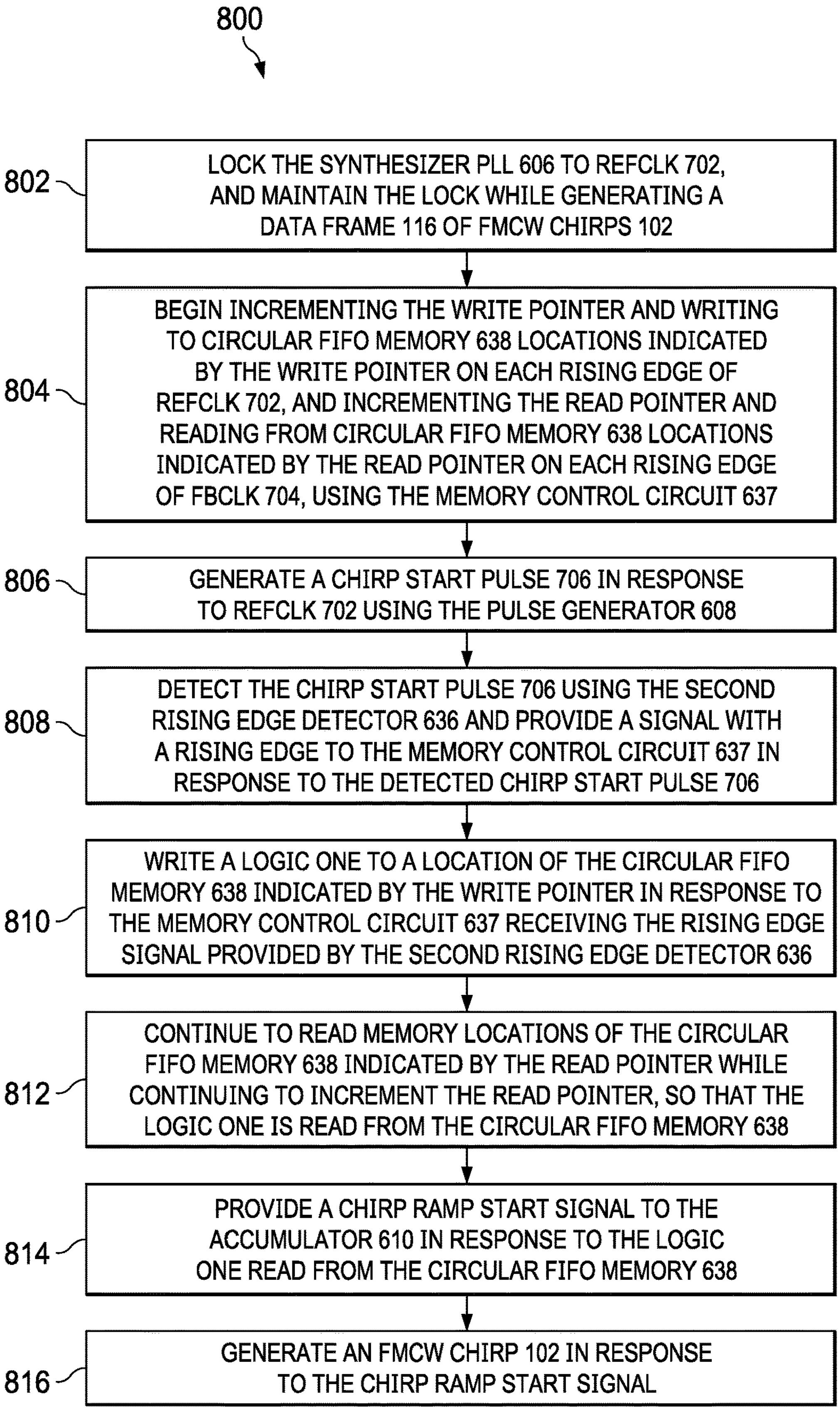
FIG. 8 is an example process for operating the FMCW radar system of FIG. 6.

FIG. 8 is an example process 800 for operating the FMCW radar system 600 of FIG. 6. In step 802, lock the synthesizer PLL 606 to REFCLK 702, and maintain the lock while generating a data frame 116 of FMCW chirps 102. In step 804, begin incrementing the write pointer and writing to circular FIFO memory 638 locations indicated by the write pointer on each rising edge of REFCLK 702, and incrementing the read pointer and reading from circular FIFO memory 638 locations indicated by the read pointer on each rising edge of FBCLK 704, using the memory control circuit 637. The circular FIFO memory 638 is initialized to store zeroes, and the memory control circuit 637 writes zeroes to memory locations of the circular FIFO memory 638 by default.

In step 806, generate a Chirp Start Pulse 706 in response to REFCLK 702 using the pulse generator 608. In step 808, detect the Chirp Start Pulse 706 using the second rising edge detector 636 and provide a signal with a rising edge to the memory control circuit 637 in response to the detected Chirp Start Pulse 706.

In step 810, write a logic one to a location of the circular FIFO memory 638 indicated by the write pointer in response to the memory control circuit 637 receiving the rising edge signal provided by the second rising edge detector 636. In step 812, continue to read memory locations of the circular FIFO memory 638 indicated by the read pointer while continuing to increment the read pointer, so that the logic one is read from the circular FIFO memory 638. In step 814, provide a chirp ramp start signal to the accumulator 610 in response to the logic one read from the circular FIFO memory 638. In step 816, generate an FMCW chirp 102 in response to the chirp ramp start signal. In an example, the chirp ramp start signal is the logic one read from the circular FIFO memory 638.

Figure 9:
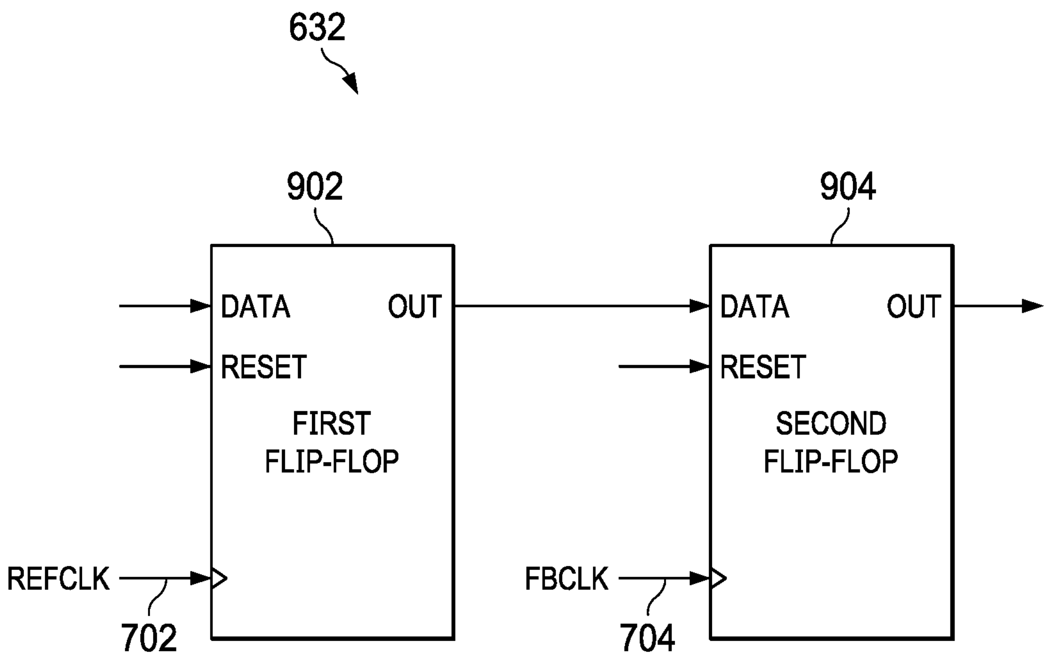
FIG. 9 is a functional block diagram of the synchronizer of FIG. 6.

FIG. 9 is a functional block diagram of an example synchronizer 632 of FIG. 6. The synchronizer 632 includes a first flip-flop 902 and a second flip-flop 904. The first and second flip-flops 902 and 904 each include a data input, a reset input, a clock input, and an output. The clock input of the first flip-flop 902 is connected to the output of the reference clock generator 602, so that the first flip-flop 902 is clocked by REFCLK 702. The clock input of the second flip-flop 904 is connected to the output of the FB divider 630, so that the second flip-flop 904 is clocked by FBCLK 704. The output of the first flip-flop 902 is connected to the data input of the second flip-flop 904. An output of the second flip-flop 904 corresponds to the output of the synchronizer 632, which is connected to the input of the first rising edge detector 634.

The first and second flip-flops 902 and 904 each receive an asserted RESET signal. This occurs prior to the pulse generator 608 providing a Chirp Start Pulse 706, while the FMCW radar system 600 is in the first mode (prior to the synthesizer PLL 606 locking). While the RESET signal is asserted, the first flip-flop 902 stores and outputs a logic zero in response to a rising edge of REFCLK 702. While the RESET signal is asserted, the second flip-flop 904 stores and outputs a logic zero in response to a rising edge of FBCLK 704.

The first flip-flop 902 receives the Chirp Start Pulse 706 from the pulse generator 608. While the Chirp Start Pulse 706 is asserted, the first flip-flop 902 stores and outputs a logic one in response to a rising edge of REFCLK 702. While the first flip-flop 902 outputs a logic one, the second flip-flop 904 stores and outputs a logic one in response to a rising edge of FBCLK 704.

Figure 10A:
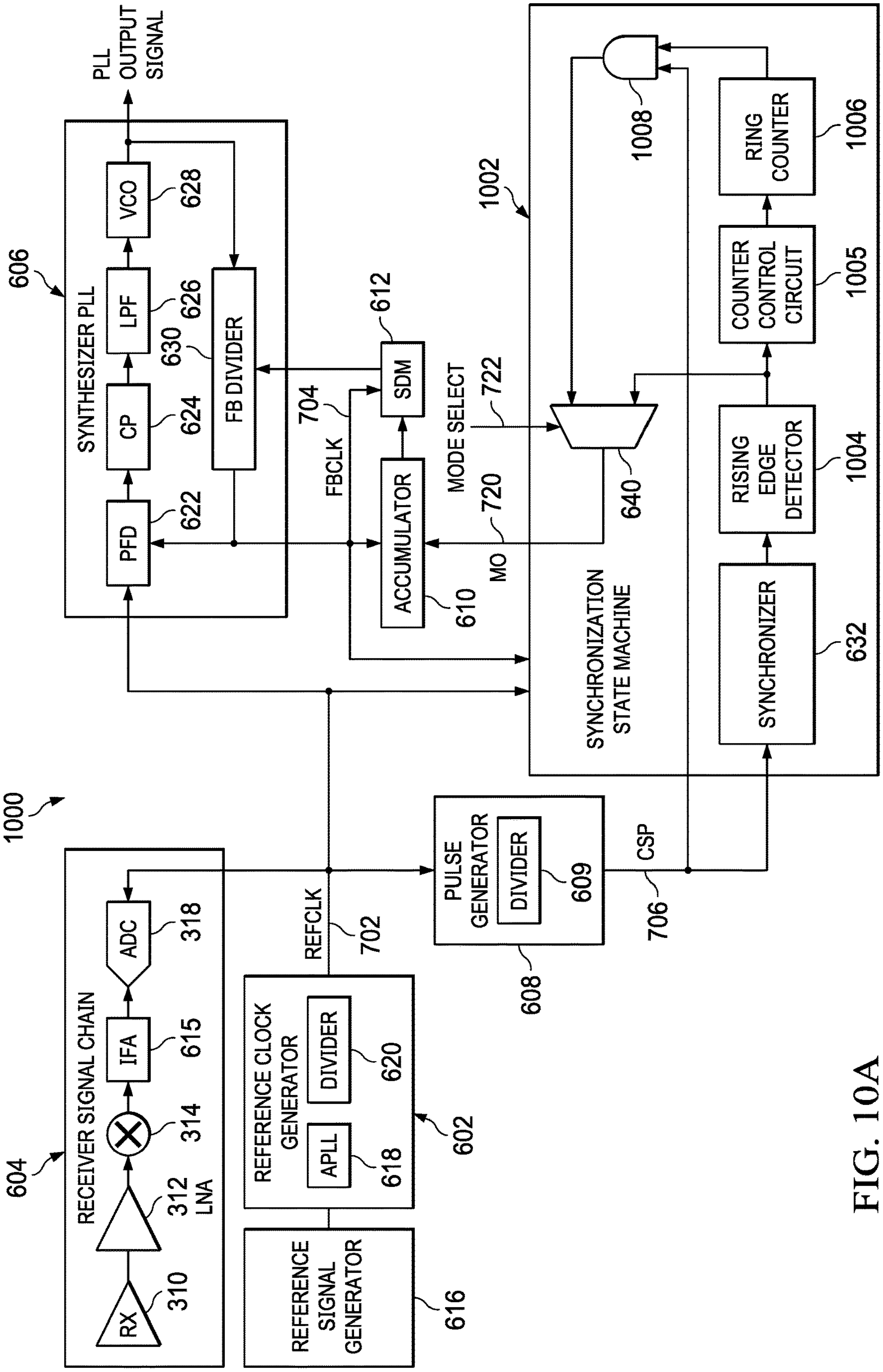
FIG. 10A is a functional block diagram of a third example FMCW radar system.

FIG. 10A is a functional block diagram of a third example FMCW radar system 1000. The FMCW radar system 1000 of FIG. 10 is similar to the FMCW radar system 600 of FIG. 6. The FMCW radar system 1000 includes a synchronization state machine 1002 that includes the synchronizer 632, a rising edge detector 1004, a counter control circuit 1005, a ring counter 1006, a logical AND gate 1008, and the multiplexer 640. The pulse generator 608 is connected to provide the Chirp Start Pulse 706 to the synchronizer 632 and to a first input of the logical AND gate 1008. An output of the synchronizer 632 is connected to an input of the rising edge detector 1004. An output of the rising edge detector 1004 is connected to an input of the counter control circuit 1005 a first input of the multiplexer 640. An output of the counter control circuit 1005 is connected to an input of the ring counter 1006. An output of the ring counter 1006 is connected to a second input of the logical AND gate 1008. An output of the logical AND gate is connected to a second input of the multiplexer 640.

A first mode of the FMCW radar system 1000, corresponding to a pre-lock state of the synthesizer PLL 606, is similar to a first mode of the FMCW radar system 600 of FIG. 6 described with respect to FIG. 7. In the first mode of the FMCW radar system 1000, the rising edge detector 1004 functions similarly to the function of the first rising edge detector 634 in the first mode of the FMCW radar system 600.

In a second mode of the FMCW radar system 1000, the rising edge detector 1004 detects a rising edge of a Chirp Start Pulse 706 synchronized by the synchronizer 632 from the REFCLK 702 domain to the FBCLK 704 domain. In response to detecting the rising edge of the synchronized Chirp Start Pulse 706, the rising edge detector 1004 provides an asserted signal to the ring counter 1006.

Figure 10B:
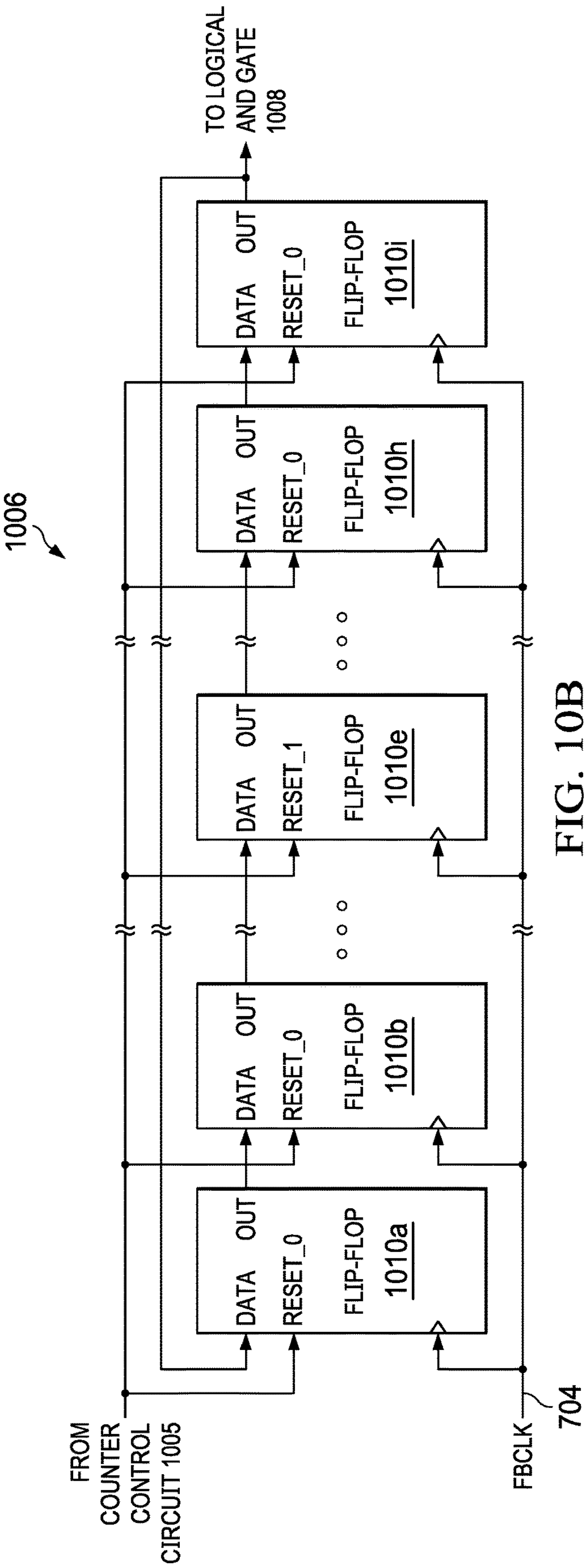
FIG. 10B is a functional block diagram of the ring counter of FIG. 10A.

FIG. 10B is a functional block diagram of the ring counter 1006 of FIG. 10A. The ring counter 1006 includes a number P flip-flops 1010. In the illustrated example, P equals nine. Each of the flip-flops 1010 (1010*a*, 1010*b*, . . . , 1010*i*) includes a data input, a clock input, a reset input, and an output. The clock inputs are each connected to the output of the FB divider 630, so that the flip-flops 1010 are clocked by FBCLK 704. The output of each flip-flop 1010 is connected to the data input of a sequentially next one of the flip-flops 1010. The output of the sequentially last flip-flop 1010*i* is connected to the data input of the sequentially first flip-flop 1010*a*. The output of the sequentially last flip-flop 1010*i* is also the output of the ring counter 1006, which is connected to the second input of the multiplexer 640.

The reset inputs of the ring counter 1006 are connected to the output of the rising edge detector 1004, so that the flip-flops 1010 reset in response to the asserted signal provided by the rising edge detector 1004. A described above, the asserted signal is responsive to a rising edge of the Chirp Start Pulse 706. The flip-flops 1010 are configured so that a middle one of the flip-flops 1010*c* (a fifth one in the illustrated example) is reset to store a logic one, and the rest of the flip-flops 1010*a*, . . . , 1010*d*, 1010*f*, . . . , 1010*i* are reset to store a logic zero. This is shown as RESET_0 (reset to logic zero) and RESET_1 (reset to logic one). Accordingly, after receiving an asserted RESET signal, the ring counter 1006 is reset to store 000010000. In some examples, the ring counter 1006 is configured to store a logic one in a number $R^{th}$ flip-flop 1010.

The counter control circuit 1005 provides an asserted RESET signal in response to a first asserted signal provided by the rising edge detector 1004 for a data frame 116, so that the flip-flops 1010 are reset once per data frame 116. This means that in each data frame 116, a delay is introduced by the synchronizer 632 once, at the beginning of the first FMCW chirp 102 of the data frame. This delay corresponds to a number of cycles of FBCLK 704 that pass from the synchronizer 632 receiving the Chirp Start Pulse 706 to the ring counter 1006 receiving the asserted RESET signal.

The ring counter 1006 increments on each rising edge of FBCLK 704 by passing the logic one from the flip-flop 1010 to a sequentially next flip-flop 1010. For example, after being reset, the ring counter 1006 will store 000010000, then 000001000, then 000000100, then 000000010, then 000000001, at which point the ring counter 1006 will output the logic one. Accordingly, the ring counter 1006 outputs a logic one on a $(P-R+1)^{th}$ rising edge of FBCLK 704 following generation of a Chirp Start Pulse 706. This corresponds to one rising edge of FBCLK 704 used to reset the ring counter 1006, plus P minus R rising edges of FBCLK 704 incrementing the ring counter so that the logic one is provided to the output of the ring counter 1006. The ring counter 1006 also outputs a logic one every P cycles thereafter (in the illustrated example, every nine cycles), but because there is no Chirp Start Pulse 706 provided to the logical AND gate 1008, no chirp ramp start signal is provided to the accumulator 610. In the next cycle of FBCLK 704, the ring counter 1006 will store 100000000. In some examples, the ring counter 1006 is referred to as a one-hot ring counter.

In some examples, the Chirp Start Pulse 706 has an asserted duration of S cycles of REFCLK 702. In some examples, S equals P. The logical AND gate 1008 outputs a logic one in response to receiving both the asserted Chirp Start Pulse 706 and the logic one provided by the ring counter 1006. In some examples, the logic one provided by the logical AND gate 1008 corresponds to a chirp ramp start signal provided to the accumulator 610 via the multiplexer 640. In some examples, P and S are selected to avoid a race condition between the Chirp Start Pulse 706 and the logic one output provided by the ring counter 1006. In some examples, there are similar reasons why delay is the same between receipt of each Chirp Start Pulse 706 of a data frame 116 by the synchronization state machine 1002 and output of the corresponding chirp ramp start signal to the accumulator 610 triggering generation of an FMCW chirp 102 as for the synchronization state machine 614 of FIG. 6.

Figure 11:
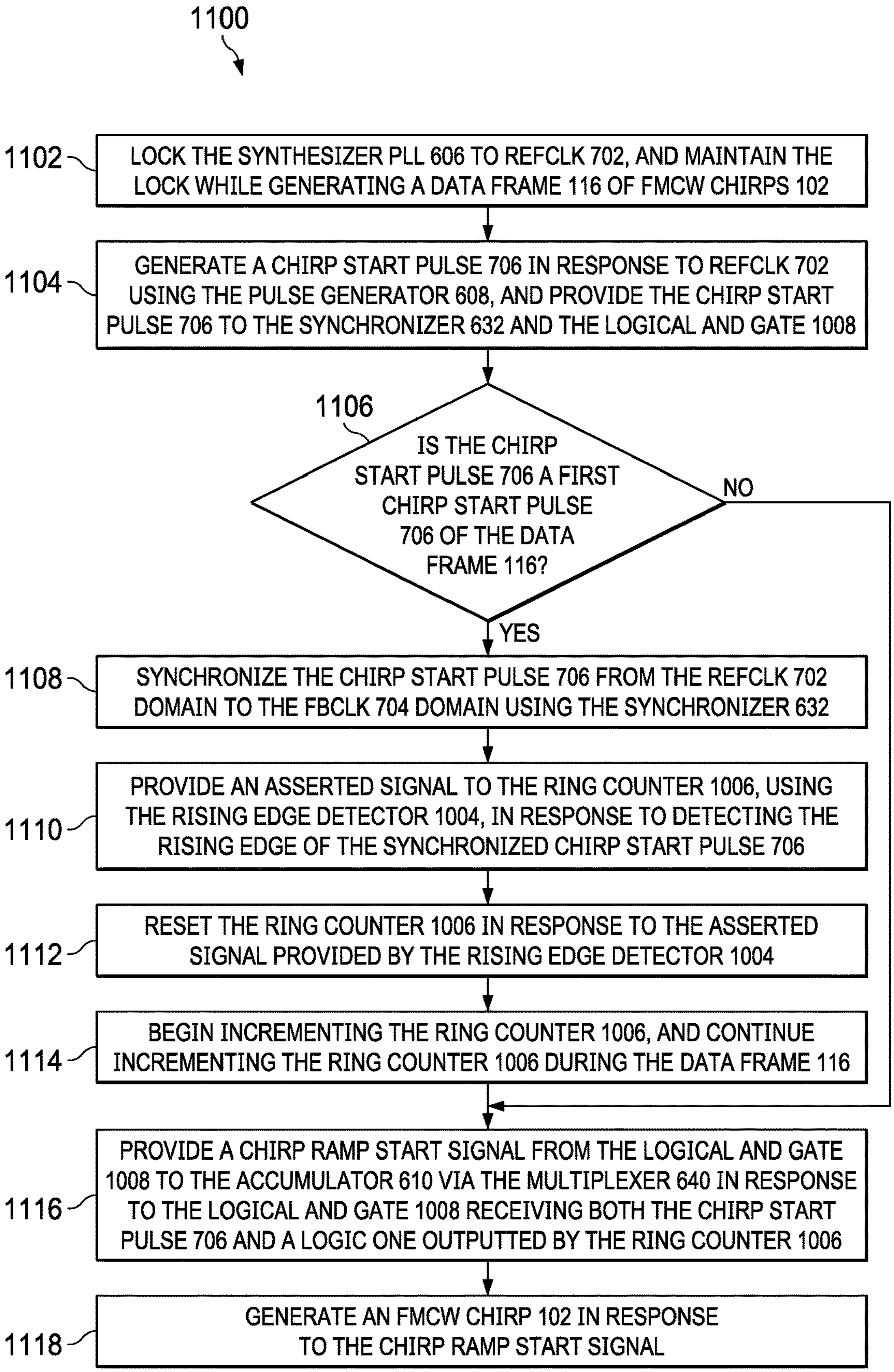
FIG. 11 is an example process for operating the FMCW radar system 1000 of FIG. 10A.

FIG. 11 is an example process 1100 for operating the FMCW radar system 1000 of FIG. 10A. In step 1102, lock the synthesizer PLL 606 to REFCLK 702, and maintain the lock while generating a data frame 116 of FMCW chirps 102. In step 1104, generate a Chirp Start Pulse 706 in response to REFCLK 702 using the pulse generator 608, and provide the Chirp Start Pulse 706 to the synchronizer 632 and the logical AND gate 1008. In step 1106, determine whether the Chirp Start Pulse 706 is a first Chirp Start Pulse 706 of the data frame 116. If the Chirp Start Pulse 706 is the first Chirp Start Pulse of the data frame 116, the process 1100 proceeds at step 1116. Otherwise, the process continues at step 1108.

In step 1108, synchronize the Chirp Start Pulse 706 from the REFCLK 702 domain to the FBCLK 704 domain using the synchronizer 632. In step 1110, provide an asserted signal to the ring counter 1006, using the rising edge detector 1004, in response to detecting the rising edge of the synchronized Chirp Start Pulse 706. In step 1112, reset the ring counter 1006 in response to the asserted signal provided by the rising edge detector 1004. In step 1114, begin incrementing the ring counter 1006, and continue incrementing the ring counter 1006 during the data frame 116. After step 1114, continue at step 1116.

In step 1116, provide a chirp ramp start signal from the logical AND gate 1008 to the accumulator 610 via the multiplexer 640 in response to the logical AND gate 1008 receiving both the Chirp Start Pulse 706 and a logic one outputted by the ring counter 1006. In step 1118, generate an FMCW chirp 102 in response to the chirp ramp start signal.

Modifications are possible in the described embodiments, and other embodiments are possible, within the scope of the claims.

In some examples, a synchronization state machine 614 or 1002 is fabricated on a same integrated circuit as one or more of a DSP 302 or other processor, a reference clock generator 602, a receiver signal chain 604 (including or excepting the receiver 310), a synthesizer PLL 606, a pulse generator 608, an accumulator 610, an SDM 612, and/or a reference signal generator 616.

In some examples, a synchronization state machine, such as a synchronization state machines 614 or 1002 described above, can be used to enable constant inter-signal delay with respect to transceiver based systems other than an FMCW radar system, such as wired or wireless digital communication systems or other types of radar sensors. Accordingly, in some examples, a signal other than an FMCW chirp is triggered by the start signal provided by the synchronization state machine.

In some examples, a processing circuit other than a DSP is used in an FMCW radar system, such as a central processing unit (CPU) or a microcontroller unit (MCU).

In some examples, a spectral estimation technique other than FFT is used to perform range, range-Doppler, and angle spectral estimations.

In some examples, an output of the circular FIFO memory 638 is connected to the second input of the multiplexer 640 so that the circular FIFO memory 638 provides read data directly to the multiplexer 640—and accordingly, the accumulator 610 (while the Mode Select signal 722 has the FIFO Enable value).

In some examples, the synchronizer 632 and the first rising edge detector 634 can together be described as a first trigger circuit for triggering generation of an FMCW signal. In some examples, the second rising edge detector 636 can be described as a second trigger circuit for triggering generation of an FMCW signal.

In some examples, the accumulator 610, the SDM 612, and the FB divider 630 can together be described as a chirp ramp control circuit that, in response to receiving a chirp ramp start signal, ramps a frequency of the PLL output signal to generate an FMCW chirp 102. In some examples, a chirp ramp start signal is a logic one output by the circular FIFO memory 638 and received by the accumulator 610.

In some examples, certain actions are taken in response to falling edges of signals.

In some examples, the ring counter 1006 is reset to a value other than logic zeroes except for a logic one in a middle flip-flop. In some examples, a value to which the ring counter 1006 is reset is responsive to a maximum delay (jitter) of the synchronizer 632.

In some examples, the write pointer, the read pointer, and the ring counter 1006 can each be modeled as a counter.

In some examples, a synchronization state machine 614 or 1002, or a state machine or a circuit other than a state machine configured to perform a similar function as a synchronization state machine 614 or 1002, is referred to herein as a synchronization circuit.

In some examples, reference clock refers to the reference clock generator 602 or other on-chip clock circuit configured to couple to an on-chip or off-chip oscillator, such as a crystal oscillator, that provides a reference signal used to generate a reference clock signal.

In some examples, a reference clock generating a reference clock signal refers to the reference clock generator 602 generating REFCLK 702 in response to the reference signal provided by the reference signal generator 616.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (for example, programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including multiple functional blocks may instead include only the functional blocks within a single physical device (for example, a semiconductor die and/or integrated circuit (IC) package) and may be adapted to be coupled to at least some of the functional blocks to form the described structure either at a time of manufacture or after a time of manufacture, for example, by an end-user and/or a third-party.

Circuits described herein are reconfigurable to include the replaced components to provide functionality at least partially similar to functionality available prior to the component replacement.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

While certain elements of the described examples may be included in an IC and other elements are external to the IC, in other examples, additional or fewer features may be incorporated into the IC. In addition, some or all of the features illustrated as being external to the IC may be included in the IC and/or some features illustrated as being internal to the IC may be incorporated outside of the IC. As used herein, the term "IC" means one or more circuits that are: (i) incorporated in/over a semiconductor substrate; (ii) incorporated in a single semiconductor package; (iii) incorporated into the same module; and/or (iv) incorporated in/on the same PCB.

Unless otherwise stated, "about," "approximately," or "substantially" preceding a value means+/−10 percent of the stated value, or, if the value is zero, a reasonable range of values around zero.

What is claimed is:

1. A frequency modulated continuous wave (FMCW) radar, comprising:
- a reference clock configured to generate a reference clock signal;
- a phase locked loop (PLL) configured to generate a feedback clock signal in response to the reference clock signal, and to generate an output signal in response to the feedback clock signal;
- a pulse generator configured to output a chirp start pulse in response to the reference clock signal;
- a counter configured to increment a count in response to the feedback clock signal;
- a chirp ramp control circuit configured to cause the PLL to ramp a frequency of the output signal in response to a chirp ramp start signal; and
- a synchronization circuit configured to provide the chirp ramp start signal to the chirp ramp control circuit in response to the reference clock signal, the feedback clock signal, the chirp start pulse, and the count.

2. The FMCW radar of claim 1, wherein the counter is a first counter and the count is a first count, the FMCW radar further comprising:
- a second counter configured to increment a second count in response to the reference clock signal;
- a memory;
- wherein the synchronization circuit is configured to:
  - cause the memory to store a value in a selected location of the memory, the selected location of the memory selected in response to the second count and the chirp start pulse; and provide the chirp ramp start signal to the chirp ramp control circuit in response to the selected location of the memory and the first count.

3. The FMCW radar of claim 2, wherein the second count is a write pointer of the memory, the first count is a read pointer of the memory, and the memory is a circular FIFO memory.

4. The FMCW radar of claim 3, wherein the circular FIFO memory includes M distinct memory locations, and the second count is configured to equal the first count plus a count corresponding to M/2 of the distinct memory locations while the PLL is not phase locked.

5. The FMCW radar of claim 2, further comprising a synchronizer configured to synchronize the chirp start pulse from a clock domain of the reference clock signal to a clock domain of the feedback clock signal to generate a synchronized chirp start pulse, and to provide the synchronized chirp start pulse to the synchronization circuit, so that the synchronization circuit causes the memory to store the value in response to the synchronized chirp start pulse.

6. The FMCW radar of claim 5, wherein the synchronizer includes a first flip-flop and a second flip-flop each including an input and an output, the first flip-flop clocked by the reference clock and the second flip-flop clocked by the feedback clock, the input of the first flip-flop coupled to the pulse generator, and the input of the second flip-flop coupled to the output of the first flip-flop.

7. The FMCW radar of claim 1, wherein the counter is a ring counter.

8. The FMCW radar of claim 7, wherein the synchronization circuit is configured to reset the counter in response to a first chirp start pulse of a data frame, and not in response to subsequent chirp start pulses of the data frame.

9. A frequency modulated continuous wave (FMCW) radar system, comprising:

a reference clock configured to generate a reference clock signal;

a receiver signal chain having a data input and a clock input and including an analog to digital converter (ADC), the data input adapted to be coupled to a receiver, the clock input coupled to the reference clock, the ADC configured to process a signal received at the data input in response to the reference clock signal;

a phase locked loop (PLL) configured to generate a feedback clock signal in response to the reference clock signal, and to generate an output signal in response to the feedback clock signal;

a pulse generator configured to output a chirp start pulse in response to the reference clock signal;

a counter configured to increment a count in response to the feedback clock signal;

a chirp ramp control circuit configured to cause the PLL to ramp a frequency of the output signal in response to a chirp ramp start signal and the feedback clock signal; and a synchronization circuit configured to provide the chirp ramp start signal to the chirp ramp control circuit in response to the reference clock signal, the feedback clock signal, the chirp start pulse, and the count.

10. The FMCW radar system of claim 9, wherein the counter is a first counter and the count is a first count, the FMCW radar further comprising:

a second counter configured to increment a second count in response to the reference clock signal;

a memory;

wherein the synchronization circuit is configured to:

cause the memory to store a value in a selected location of the memory, the selected location of the memory selected in response to the second count and the chirp start pulse; and provide the chirp ramp start signal to the chirp ramp control circuit in response to the selected location of the memory and the first count.

11. The FMCW radar system of claim 10, wherein the second count is a write pointer of the memory, the first count is a read pointer of the memory, and the memory is a circular FIFO memory.

12. The FMCW radar system of claim 11, wherein the circular FIFO memory includes M distinct memory locations, and the second count is configured to equal the first count plus a count corresponding to M/2 of the distinct memory locations while the PLL is not phase locked.

13. The FMCW radar system of claim 10, further comprising a synchronizer configured to synchronize the chirp start pulse from a clock domain of the reference clock signal to a clock domain of the feedback clock signal to generate a synchronized chirp start pulse, and to provide the synchronized chirp start pulse to the synchronization circuit, so that the synchronization circuit causes the memory to store the value in response to the synchronized chirp start pulse.

14. The FMCW radar system of claim 13, wherein the synchronizer includes a first flip-flop and a second flip-flop each including an input and an output, the first flip-flop clocked by the reference clock and the second flip-flop clocked by the feedback clock, the input of the first flip-flop coupled to the pulse generator, and the input of the second flip-flop coupled to the output of the first flip-flop.

15. The FMCW radar system of claim 9, wherein the counter is a ring counter.

16. The FMCW radar system of claim 15, wherein the synchronization circuit is configured to reset the counter in response to a first chirp start pulse of a data frame, and not in response to subsequent chirp start pulses of the data frame.

17. A method of operating a frequency modulated continuous wave (FMCW) radar, the method comprising:

generating, using a reference clock, a reference clock signal;

generating, using a phase locked loop (PLL), a feedback clock signal in response to the reference clock signal, and an output signal in response to the feedback clock signal;

generating, using a pulse generator, a chirp start pulse in response to the reference clock signal;

incrementing a counter to generate a count in response to the feedback clock signal;

providing a chirp ramp start signal in response to the reference clock signal, the feedback clock signal, the chirp start pulse, and the count; and ramping a frequency of the output signal in response to the chirp ramp start signal.

18. The method of claim 17, wherein the count is a first count, the method further comprising:

counting a second count in response to the reference clock signal;

storing a value in a selected location of a memory, the selected location of the memory selected in response to the second count and the chirp start pulse; and providing the chirp ramp start signal in response to the selected location of the memory and the first count.

19. The method of claim 17, further comprising resetting the counter in response to a first chirp start pulse of a data frame, and not in response to subsequent chirp start pulses of the data frame.

20. The method of claim 17, further comprising synchronizing the chirp start pulse from a clock domain of the reference clock signal to a clock domain of the feedback clock signal to generate a synchronized chirp start pulse, so that the providing is performed in response to the synchronized chirp start pulse.

* * * * *